(12) United States Patent
Wang et al.

(10) Patent No.: US 12,487,435 B2
(45) Date of Patent: Dec. 2, 2025

(54) OPTICAL LENS ASSEMBLY AND PHOTOGRAPHING MODULE

(71) Applicant: NEWMAX TECHNOLOGY CO., LTD., Taichung (TW)

(72) Inventors: Chi-Chang Wang, Taichung (TW); Ruei-Tze Hong, Taichung (TW)

( * ) Notice: Subject to any disclaimer, the term of this patent is extended or adjusted under 35 U.S.C. 154(b) by 338 days.

(21) Appl. No.: 18/473,308

(22) Filed: Sep. 25, 2023

(65) Prior Publication Data
US 2025/0020894 A1    Jan. 16, 2025

(30) Foreign Application Priority Data

Jul. 12, 2023 (TW) .................. 112125962

(51) Int. Cl.
  *G02B 13/00*    (2006.01)
  *G02B 9/60*    (2006.01)
(52) U.S. Cl.
  CPC ........... *G02B 13/0045* (2013.01); *G02B 9/60* (2013.01)

(58) Field of Classification Search
  CPC ........ G02B 15/145109; G02B 13/0045; G02B 9/60
  See application file for complete search history.

(56) References Cited

U.S. PATENT DOCUMENTS

2015/0085381 A1* 3/2015 Ota .................. G02B 9/60
                                                         359/714

* cited by examiner

*Primary Examiner* — Joseph P Martinez
(74) *Attorney, Agent, or Firm* — Bruce Stone LLP; Joseph A. Bruce

(57) ABSTRACT

An optical lens assembly includes, in order from an object side to an image side: a first lens with positive refractive power; a second lens with negative refractive power; a third lens with negative refractive power; a fourth lens with positive refractive power; a fifth lens with negative refractive power; wherein the optical lens assembly has a total of five lenses with refractive power, a distance from an image-side surface of the fifth lens to an image plane along an optical axis is BFL, a thickness of the second lens along the optical axis is CT2, a thickness of the third lens along the optical axis is CT3, an incident angle of a chief ray on 80% of the maximum image height of the optical lens assembly is CRA8, and the following condition is satisfied: $51.97° < CRA8*BFL/(CT2+CT3) < 97.45°$.

20 Claims, 13 Drawing Sheets

OPTICAL LENS ASSEMBLY AND PHOTOGRAPHING MODULE

BACKGROUND

Field of the Invention

The present invention relates to an optical lens assembly and photographing module, and more particularly to an optical lens assembly and photographing module applicable to electronic products.

Description of Related Art

Small camera lens devices can be widely used in various electronic devices, such as, wearable display, smart phone, tablet computer, game player, dashcam, household electronic device, IP network camera (IPCAM) or empty camera lens and so on. At the same time, small camera lens devices are constantly moving towards the direction of thin and short, the smaller the size is, it is often accompanied by the sensitivity problem of manufacturing and assembly, which makes mass production difficult and increases the cost of mass production. Or in order to reduce the assembly tolerance, you have to sacrifice the quality of the surrounding image, which makes the surrounding image blurred or deformation. Therefore, how to develop a small camera lens device that can solve one of the aforementioned problems is the motivation of the present invention.

The present invention mitigates and/or obviates the aforementioned disadvantages.

SUMMARY

The objective of the present invention is to provide an optical lens assembly and a photographing module, and the optical lens assembly has a total of five lenses with refractive power. When a specific condition is satisfied, the optical lens assembly can solve the current problems of small lens sensitivity and image quality, and has a large field of view, high resolution ability, low distortion and low manufacturing assembly tolerance, so as to improve product quality and yield.

In addition, when the lens is made of glass, the optical lens assembly of the present invention can be used at more extreme temperatures.

Therefore, an optical lens assembly in accordance with an embodiment of the present invention includes, in order from an object side to an image side: a first lens with positive refractive power; a second lens with negative refractive power; a third lens with negative refractive power; a fourth lens with positive refractive power; and a fifth lens with negative refractive power.

In the optical lens assembly, the optical lens assembly has a total of five lenses with refractive power, a distance from an image-side surface of the fifth lens to an image plane along an optical axis is BFL, a thickness of the second lens along the optical axis is CT2, a thickness of the third lens along the optical axis is CT3, an incident angle of a chief ray on 80% of the maximum image height of the optical lens assembly is CRA8, a distance from an object-side surface of the first lens to the image plane along the optical axis is TL, a maximum image height of the optical lens assembly is IMH, a radius of curvature of the object-side surface of the first lens is R1, a radius of curvature of an image-side surface of the first lens is R2, a radius of curvature of an image-side surface of the second lens is R4, a radius of curvature of an object-side surface of the third lens is R5, a radius of curvature of an image-side surface of the third lens is R6, a radius of curvature of an object-side surface of the fourth lens is R7, a radius of curvature of an object-side surface of the fifth lens is R9, a radius of curvature of the image-side surface of the fifth lens is R10, an absolute value of a displacement in parallel to the optical axis from an intersection between the object-side surface of the fourth lens and the optical axis to a maximum effective radius position on the object-side surface of the fourth lens is TDP7, an absolute value of a displacement in parallel to the optical axis from an intersection between the image-side surface of the fourth lens and the optical axis to the maximum effective radius position on the image-side surface of the fourth lens is TDP8, an absolute value of a displacement in parallel to the optical axis from an intersection between the image-side surface of the fifth lens and the optical axis to the maximum effective radius position on the image-side surface of the fifth lens is TDP10, a focal length of the second lens is f2, an entrance pupil diameter of the optical lens assembly is EPD, half of a maximum field of view of the optical lens assembly is HFOV, an Abbe number of the first lens is Vd1, an Abbe number of the second lens is Vd2, and at least one of the following condition is satisfied:

$$51.97° < CRA8 * BFL / (CT2 + CT3) < 97.45°;$$

$$0.88 < TL / IMH < 1.39;$$

$$-4.10 < (R5 + R6)/(R1 + R2) < -1.68;$$

$$-9.21 \text{ mm}^2 < TDP8 * (R5 + R6) < -4.35 \text{ mm}^2;$$

$$-3.48 \text{ mm}^2 < TDP8 * R5 < -1.85 \text{ mm}^2;$$

$$-14.94 < f2 / EPD < -5.88;$$

$$1.33 < R6 / R7 < 4.37;$$

$$-5.85 < R4 / R5 < -1.28;$$

$$10.17°/\text{mm} < HFOV / TL < 15.95°/\text{mm};$$

$$-3.17 \text{ mm}^2 < TDP7 * R6 < -1.14 \text{ mm}^2;$$

$$1.63°/\text{mm} < CRA8 / R4 < 7.69°/\text{mm};$$

$$2.03 \text{ mm}^2 < EPD * (R4 + R5) < 19.81 \text{ mm}^2;$$

$$8.35°/\text{mm}^{-2} < HFOV / (EPD * R10) < 21.98°/\text{mm}^{-2};$$

$$0.2 \text{ mm}^2 < TDP10 * (R9 + R10) < 0.97 \text{ mm}^2;$$

$$59.31 < Vd1 + Vd2 < 90.28.$$

When 51.97°<CRA8*BFL/(CT2+CT3)<97.45° is satisfied, it can meet the chief ray incident on the maximum image plane of the optical lens assembly and achieve the goal of miniaturization module.

When 0.88<TL/IMH<1.39 is satisfied, the length of the lens and the image height of the optical lens assembly have a better ratio to achieve the wide field of view and the goal of miniaturization module.

When −4.10<(R5+R6)/(R1+R2)<−1.68 is satisfied, a large amount of light is obtained by the appropriate configuration of the radii of curvature of the first lens and the third lens.

When −9.21 mm²<TDP8*(R5+R6)<−4.35 mm² is satisfied, the optical lens assembly has appropriate configuration of the radius of curvature and the lens shape, so as to obtain a large amount of light.

When $-3.48 \text{ mm}^2 < \text{TDP8}*\text{R5} < -1.85 \text{ mm}^2$ is satisfied, the optical lens assembly has appropriate configuration of the radius of curvature and the lens shape, so as to obtain a large amount of light.

When $-14.94 < \text{f2/EPD} < -5.88$ is satisfied, it is conducive to correcting the aberration to improve the image quality of the optical lens assembly by the appropriate configuration of the refractive power of the second lens and the incident pupil.

When $1.33 < \text{R6/R7} < 4.37$ is satisfied, it is conducive to correcting the aberration by the appropriate configuration of the radius of curvature between the third lens and the fourth lens.

When $-5.85 < \text{R4/R5} < -1.28$ is satisfied, it is conducive to correcting the aberration by the appropriate configuration of the radius of curvature between the second lens and the third lens.

When $10.17°/\text{mm} < \text{HFOV/TL} < 15.95°/\text{mm}$ is satisfied, it can achieve the wide field of view and the goal of miniaturization module.

When $-3.17 \text{ mm}^2 < \text{TDP7}*\text{R6} < -1.14 \text{ mm}^2$ is satisfied, the optical lens assembly has appropriate configuration of the radius of curvature between the third lens and the fourth lens and the lens shape, so as to obtain a large amount of light.

When $1.63°/\text{mm} < \text{CRA8/R4} < 7.69°/\text{mm}$ is satisfied, it can meet the chief ray incident on the maximum image plane of the optical lens assembly.

When $2.03 \text{ mm}^2 < \text{EPD}*(\text{R4}+\text{R5}) < 19.81 \text{ mm}^2$ is satisfied, the optical lens assembly has appropriate configuration of the radius of curvature, so as to obtain a large amount of light.

When $8.35°/\text{mm}^{-2} < \text{HFOV}/(\text{EPD}*\text{R10}) < 21.98°/\text{mm}^{-2}$ is satisfied, the optical lens assembly has appropriate configuration of the radius of curvature, so as to achieve a large field of view.

When $0.2 \text{ mm}^2 < \text{TDP10}*(\text{R9}+\text{R10}) < 0.97 \text{ mm}^2$ is satisfied, it is conducive to correcting the aberration by the appropriate configuration of the radius of curvature of the optical lens assembly and the lens shape.

When $59.31 < \text{Vd1}+\text{Vd2} < 90.28$ is satisfied, the lens material of the optical lens assembly allows for a wide variety of options, which can reduce the manufacturing cost.

Moreover, a photographing module in accordance with an embodiment of the present invention includes a lens barrel, the aforementioned optical lens assembly disposed in the lens barrel, and an image sensor disposed on an image plane of the optical lens assembly.

The present invention will be presented in further details from the following descriptions with the accompanying drawings, which show, for purpose of illustrations only, the preferred embodiments in accordance with the present invention.

DETAILED DESCRIPTION

First Embodiment

Figure 1A:
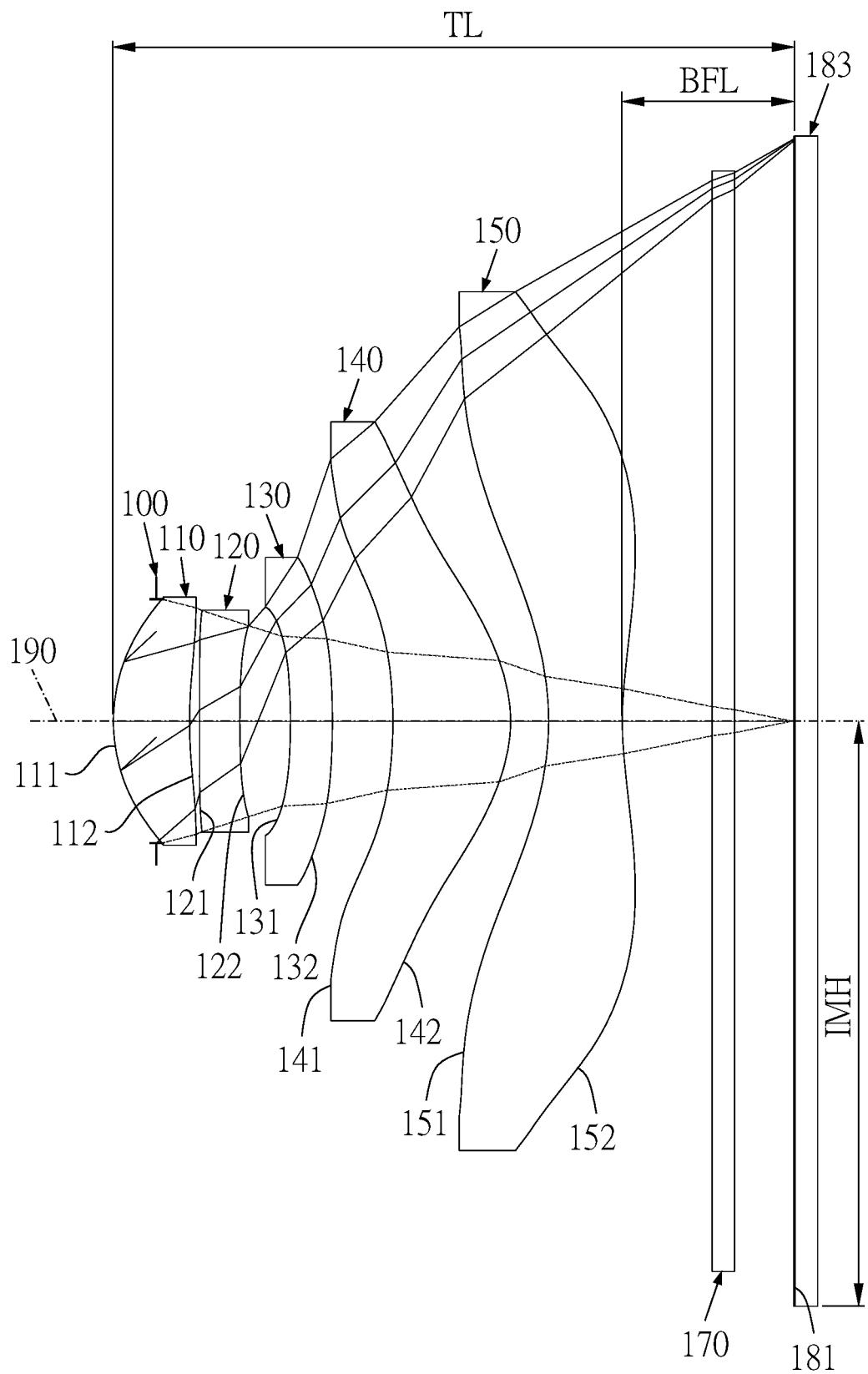
FIG. 1A is a schematic view of an optical lens assembly in accordance with a first embodiment of the present invention.
Figure 1B:
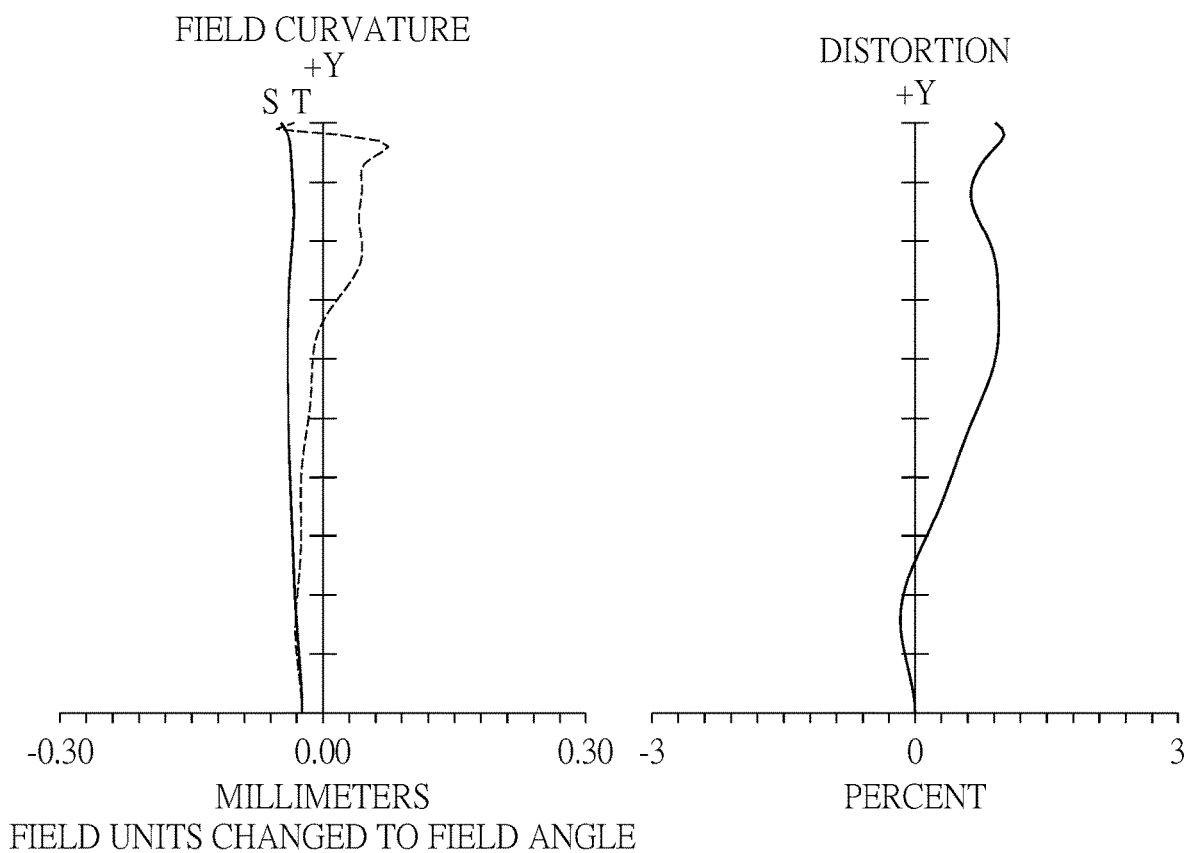
FIG. 1B is a schematic diagram showing, in order from left to right, the field curvature curve and the distortion curve of the first embodiment of the present invention.

Referring to FIGS. 1A and 1B, FIG. 1A shows a schematic view of an optical lens assembly in accordance with a first embodiment of the present invention, and FIG. 1B shows, in order from left to right, the field curvature curve and the distortion curve of the first embodiment of the present invention. As shown in FIG. 1A, the optical lens assembly includes, in order from an object side to an image side along an optical axis 190: a stop 100, a first lens 110, a second lens 120, a third lens 130, a fourth lens 140, a fifth lens 150, an optical filter 170, and an image plane 181. The optical lens assembly can cooperate with an image sensor 183 disposed on an image plane 181. The optical lens assembly has a total of five lenses with refractive power, but not is limited thereto.

The first lens 110 with positive refractive power includes an object-side surface 111 and an image-side surface 112, the object-side surface 111 of the first lens 110 is convex in a paraxial region thereof, the image-side surface 112 of the first lens 110 is concave in a paraxial region thereof, the object-side surface 111 and the image-side surface 112 of the first lens 110 are aspheric, and the first lens 110 is made of plastic.

The second lens 120 with negative refractive power includes an object-side surface 121 and an image-side surface 122, the object-side surface 121 of the second lens 120 is convex in a paraxial region thereof, the image-side surface 122 of the second lens 120 is concave in a paraxial region thereof, the object-side surface 121 and the image-side surface 122 of the second lens 120 are aspheric, and the second lens 120 is made of plastic.

The third lens 130 with negative refractive power includes an object-side surface 131 and an image-side surface 132, the object-side surface 131 of the third lens 130 is concave in a paraxial region thereof, the image-side surface 132 of the third lens 130 is convex in a paraxial region thereof, the object-side surface 131 and the image-side surface 132 of the third lens 130 are aspheric, and the third lens 130 is made of plastic.

The fourth lens 140 with positive refractive power includes an object-side surface 141 and an image-side surface 142, the object-side surface 141 of the fourth lens 140 is concave in a paraxial region thereof, the image-side surface 142 of the fourth lens 140 is convex in a paraxial region thereof, the object-side surface 141 and the image-side surface 142 of the fourth lens 140 are aspheric, and the fourth lens 140 is made of plastic.

The fifth lens 150 with negative refractive power includes an object-side surface 151 and an image-side surface 152, the object-side surface 151 of the fifth lens 150 is concave in a paraxial region thereof, the image-side surface 152 of the fifth lens 150 is concave in a paraxial region thereof, the object-side surface 151 and the image-side surface 152 of the fifth lens 150 are aspheric, and the fifth lens 150 is made of plastic.

The optical filter 170 is made of glass, is located between the fifth lens 150 and the image plane 181, and has no influence on the focal length of the optical lens assembly. In the present embodiment, the optical filter 170 is selected from IR-cut filters that allow light in the visible light wavelengths to pass therethrough.

The curve equation for the aspheric surface profiles of the respective lenses of the first embodiment is expressed as follows:

$$z(h) = \frac{ch^2}{1 + [1-(k+1)c^2h^2]^{0.5}} + \sum (A_i) \cdot (h^i)$$

wherein:
z represents the value of a reference position at a height of h with respect to a vertex of the surface of a lens along the optical axis 190;
c represents a paraxial curvature (i.e., a curvature of a lens surface in a paraxial region thereof) equal to 1/R (R: a paraxial radius of curvature);
h represents a vertical distance from the point on the curve of the aspheric surface to the optical axis 190;
k represents the conic constant; and
Ai represents the i-th order aspheric coefficient.

In the first embodiment of the optical lens assembly, a focal length of the optical lens assembly is f, a f-number of the optical lens assembly is Fno, a maximum field of view of the optical lens assembly is FOV, an entrance pupil diameter of the optical lens assembly is EPD, and the following conditions are satisfied: f=3.05 mm; Fno=2.48; FOV=86.50 degrees; and EPD=1.23 mm.

In the first embodiment of the optical lens assembly, a distance from the image-side surface 152 of the fifth lens 150 to the image plane 181 along the optical axis 190 is BFL, a thickness of the second lens 120 along the optical axis 190 is CT2, a thickness of the third lens 130 along the optical axis 190 is CT3, an incident angle of a chief ray on 80% of a maximum image height of the optical lens assembly is CRA8, and the following condition is satisfied: CRA8*BFL/(CT2+CT3)=73.81°.

In the first embodiment of the optical lens assembly, a distance from the object-side surface 111 of the first lens 110 to the image plane 181 along the optical axis 190 is TL, a maximum image height of the optical lens assembly is IMH, and the following condition is satisfied: TL/IMH=1.16.

In the first embodiment of the optical lens assembly, a radius of curvature of the object-side surface 111 of the first lens 110 is R1, a radius of curvature of the image-side surface 112 of the first lens 110 is R2, a radius of curvature of the object-side surface 131 of the third lens 130 is R5, a radius of curvature of the image-side surface 132 of the third lens 130 is R6, and the following condition is satisfied: (R5+R6)/(R1+R2)=−2.15.

In the first embodiment of the optical lens assembly, an absolute value of a displacement in parallel to the optical axis 190 from an intersection between the image-side surface 142 of the fourth lens 140 and the optical axis 190 to a maximum effective radius position on the image-side surface 142 of the fourth lens 140 is TDP8, the radius of curvature of the object-side surface 131 of the third lens 130 is R5, the radius of curvature of the image-side surface 132 of the third lens 130 is R6, and the following condition is satisfied: TDP8*(R5+R6)=−5.43 mm².

In the first embodiment of the optical lens assembly, the absolute value of a displacement in parallel to the optical axis 190 from the intersection between the image-side surface 142 of the fourth lens 140 and the optical axis 190 to the maximum effective radius position on the image-side surface 142 of the fourth lens 140 is TDP8, the radius of curvature of the object-side surface 131 of the third lens 130 is R5, and the following condition is satisfied: TDP8*R5=−2.32 mm².

In the first embodiment of the optical lens assembly, a focal length of the second lens 120 is f2, the entrance pupil diameter of the optical lens assembly is EPD, and the following condition is satisfied: f2/EPD=−7.35.

In the first embodiment of the optical lens assembly, the radius of curvature of the image-side surface 132 of the third lens 130 is R6, a radius of curvature of the object-side surface 141 of the fourth lens 140 is R7, and the following condition is satisfied: R6/R7=1.89.

In the first embodiment of the optical lens assembly, a radius of curvature of the image-side surface 122 of the second lens 120 is R4, the radius of curvature of the object-side surface 131 of the third lens 130 is R5, and the following condition is satisfied: R4/R5=−1.60.

In the first embodiment of the optical lens assembly, half of the maximum field of view of the optical lens assembly is HFOV, the distance from the object-side surface 111 of the first lens 110 to the image plane 181 along the optical axis 190 is TL, and the following condition is satisfied: HFOV/TL=12.73°/mm.

In the first embodiment of the optical lens assembly, an absolute value of a displacement in parallel to the optical axis 190 from an intersection between the object-side surface 141 of the fourth lens 140 and the optical axis 190 to a maximum effective radius position on the object-side surface 141 of the fourth lens 140 is TDP7, the radius of curvature of the image-side surface 132 of the third lens 130 is R6, and the following condition is satisfied: TDP7*R6=−1.43 mm².

In the first embodiment of the optical lens assembly, the incident angle of the chief ray on 80% of the maximum image height of the optical lens assembly is CRA8, the radius of curvature of the image-side surface 122 of the second lens 120 is R4, and the following condition is satisfied: CRA8/R4=6.41°/mm.

In the first embodiment of the optical lens assembly, the entrance pupil diameter of the optical lens assembly is EPD, the radius of curvature of the image-side surface 122 of the second lens 120 is R4, the radius of curvature of the object-side surface 131 of the third lens 130 is R5, and the following condition is satisfied: EPD*(R4+R5)=2.53 mm².

In the first embodiment of the optical lens assembly, half of the maximum field of view of the optical lens assembly is HFOV, the entrance pupil diameter of the optical lens assembly is EPD, a radius of curvature of the image-side surface 152 of the fifth lens 150 is R10, and the following condition is satisfied: HFOV/(EPD*R10)=18.32°/mm⁻².

In the first embodiment of the optical lens assembly, an absolute value of a displacement in parallel to the optical axis 190 from an intersection between the image-side surface 152 of the fifth lens 150 and the optical axis 190 to a maximum effective radius position on the image-side surface 152 of the fifth lens 50 is TDP10, a radius of curvature of the object-side surface 151 of the fifth lens 150 is R9, the radius of curvature of the image-side surface 152 of the fifth lens 150 is R10, and the following condition is satisfied: TDP10*(R9+R10)=0.25 mm².

In the first embodiment of the optical lens assembly, an Abbe number of the first lens 110 is Vd1, an Abbe number of the second lens 120 is Vd2, and the following condition is satisfied: Vd1+Vd2=75.23.

The detailed optical data of the respective elements in the optical lens assembly of the first embodiment is shown in Table 1, and the aspheric coefficients of the lenses in the first embodiment is shown in Tables 2.

TABLE 1

Embodiment 1
f = 3.05 mm, Fno = 2.48, FOV = 86.50°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | Stop | Infinity | | −0.215 | | | | |
| 2 | First lens | 0.880 | (ASP) | 0.381 | plastic | 1.545 | 56.0 | 2.18 |
| 3 | | 2.859 | (ASP) | 0.049 | | | | |
| 4 | Second lens | 52.165 | (ASP) | 0.202 | plastic | 1.671 | 19.2 | −9.05 |
| 5 | | 5.480 | (ASP) | 0.253 | | | | |
| 6 | Third lens | −3.423 | (ASP) | 0.207 | plastic | 1.661 | 20.4 | −21.53 |
| 7 | | −4.602 | (ASP) | 0.303 | | | | |
| 8 | Fourth lens | −2.438 | (ASP) | 0.587 | plastic | 1.545 | 56.0 | 1.87 |
| 9 | | −0.782 | (ASP) | 0.191 | | | | |
| 10 | Fifth lens | −1.451 | (ASP) | 0.366 | plastic | 1.545 | 56.0 | −1.46 |
| 11 | | 1.918 | (ASP) | 0.449 | | | | |
| 12 | Optical filter | Infinity | | 0.110 | glass | 1.517 | 64.2 | |
| 13 | | Infinity | | 0.300 | | | | |
| 14 | Image plane | Infinity | | — | | | | |

The reference wavelength is 555 nm.

TABLE 2

Embodiment 1
Aspheric Coefficients

| Surface | 2 | 3 | 4 | 5 | 6 |
|---|---|---|---|---|---|
| K: | −7.9695E−01 | −9.0001E+01 | −8.8695E+01 | −1.4209E+00 | 3.4242E+01 |
| A2: | 0.0000E+00 | 0.0000E+00 | 0.0000E+00 | 0.0000E+00 | 0.0000E+00 |
| A4: | 3.3627E−02 | 4.6147E−01 | −9.7977E−02 | 2.7893E−02 | −2.3607E−01 |
| A6: | 2.6610E+00 | −6.3757E+00 | 2.3722E+00 | 6.4268E+00 | −2.9846E+00 |
| A8: | −2.8666E+01 | 6.4603E+01 | −3.4004E+01 | −9.2299E+01 | 4.3531E+01 |
| A10: | 2.2052E+02 | −4.8370E+02 | 3.4259E+02 | 8.4485E+02 | −3.3474E+02 |
| A12: | −1.2194E+03 | 2.2977E+03 | −2.2294E+03 | −4.4599E+03 | 1.2881E+03 |
| A14: | 4.6518E+03 | −6.6764E+03 | 9.4775E+03 | 1.3360E+04 | −1.1541E+03 |
| A16: | −1.1266E+04 | 1.1286E+04 | −2.5152E+04 | −1.9620E+04 | −8.7794E+03 |
| A18: | 1.5233E+04 | −1.0122E+04 | 3.7467E+04 | 5.8876E+03 | 3.0865E+04 |
| A20: | −8.7233E+03 | 3.8935E+03 | −2.3553E+04 | 1.1367E+04 | −3.1359E+04 |

| Surface | 7 | 8 | 9 | 10 | 11 |
|---|---|---|---|---|---|
| K: | 9.7207E+00 | 8.0712E−01 | −3.0343E+00 | −1.2935E+01 | −2.7916E+01 |
| A2: | 0.0000E+00 | 0.0000E+00 | 0.0000E+00 | 0.0000E+00 | 0.0000E+00 |
| A4: | −2.9860E−01 | −1.7876E−01 | −6.5313E−02 | −2.3834E−01 | −9.6522E−02 |
| A6: | 1.0031E−01 | 1.5298E−02 | −2.7184E−01 | 2.6058E−01 | −3.5233E−03 |
| A8: | −1.0045E+00 | 7.5425E−02 | 7.7151E−01 | −9.6691E−02 | 7.5861E−02 |
| A10: | 1.0124E+01 | 4.0468E−01 | −7.0511E−01 | −1.9838E−02 | −8.9240E−02 |
| A12: | −4.2249E+01 | −6.0462E−01 | 3.8940E−01 | 3.5601E−02 | 5.4151E−02 |
| A14: | 9.6736E+01 | 3.3043E−01 | −2.3397E−01 | −1.6142E−02 | −1.9385E−02 |
| A16: | −1.1573E+02 | −8.7509E−02 | 1.3578E−01 | 3.8007E−03 | 4.0881E−03 |

TABLE 2-continued

Embodiment 1
Aspheric Coefficients

| A18: | 6.1429E+01 | 1.3343E−02 | −4.4696E−02 | −4.7358E−04 | −4.6679E−04 |
|---|---|---|---|---|---|
| A20: | −8.8336E+00 | −1.3635E−03 | 5.7215E−03 | 2.4735E−05 | 2.2173E−05 |

TABLE 3

Embodiment 1

| EPD[°] | 1.23 | TL[mm] | 3.40 | BFL[mm] | 0.86 |
|---|---|---|---|---|---|
| IMH[mm] | 2.93 | TDP7[mm] | 0.31 | HFOV[°] | 43.25 |
| CRA8[°] | 35.10 | TDP8[mm] | 0.68 | TDP10[mm] | 0.53 |

In Table 1, the units of the radius of curvature, the thickness, the gap and the focal length are expressed in mm, and the surface numbers 0-14 respectively represent the surfaces from the object-side to the image-side, wherein the surface 0 represents a gap between an object and the stop 100 along the optical axis 190; the surface 1 represents a gap between the stop 100 and the first lens 110 along the optical axis 190; the stop 100 is farther away from the object-side than the object-side surface 111 of the first lens 110, so its thickness/gap value is expressed as a negative value; the surface 2 represents the thickness of the first lens 110 along the optical axis 190; the surface 3 represents a gap between the first lens 110 and the second lens 120 along the optical axis 190; the surface 4 represents the thickness of the second lens 120 along the optical axis 190; the surface 5 represents a gap between the second lens 120 and the third lens 130 along the optical axis 190; the surface 6 represents the thickness of the third lens 130 along the optical axis 190; the surface 7 represents a gap between the third lens 130 and the fourth lens 140 along the optical axis 190; the surface 8 represents the thickness of the fourth lens 140 along the optical axis 190; the surface 9 represents a gap between the fourth lens 140 and the fifth lens 150 along the optical axis 190; the surface 10 represents the thickness of the fifth lens 150 along the optical axis 190; the surface 11 represents a gap between the fifth lens 150 and the optical filter 170 along the optical axis 190; the surface 12 represents the thickness of the optical filter 170 along the optical axis 190; the surface 13 represents a gap between the optical filter 170 and the image plane 181 along the optical axis 190; and the surface 14 represents the image plane 181.

In table 2, k represents the conic constant of the equation of aspheric surface profiles, and A2, A4, A6, A8, A10, A12, A14, A16, A18, and A20 represent the high-order aspheric coefficients. The respective tables presented below for respective one of other embodiments are based on the schematic view of this embodiment, and the definitions of parameters in the tables are the same as those in Tables 1-2 of the first embodiment. Therefore, an explanation in this regard will not be provided again.

Second Embodiment

Figure 2A:
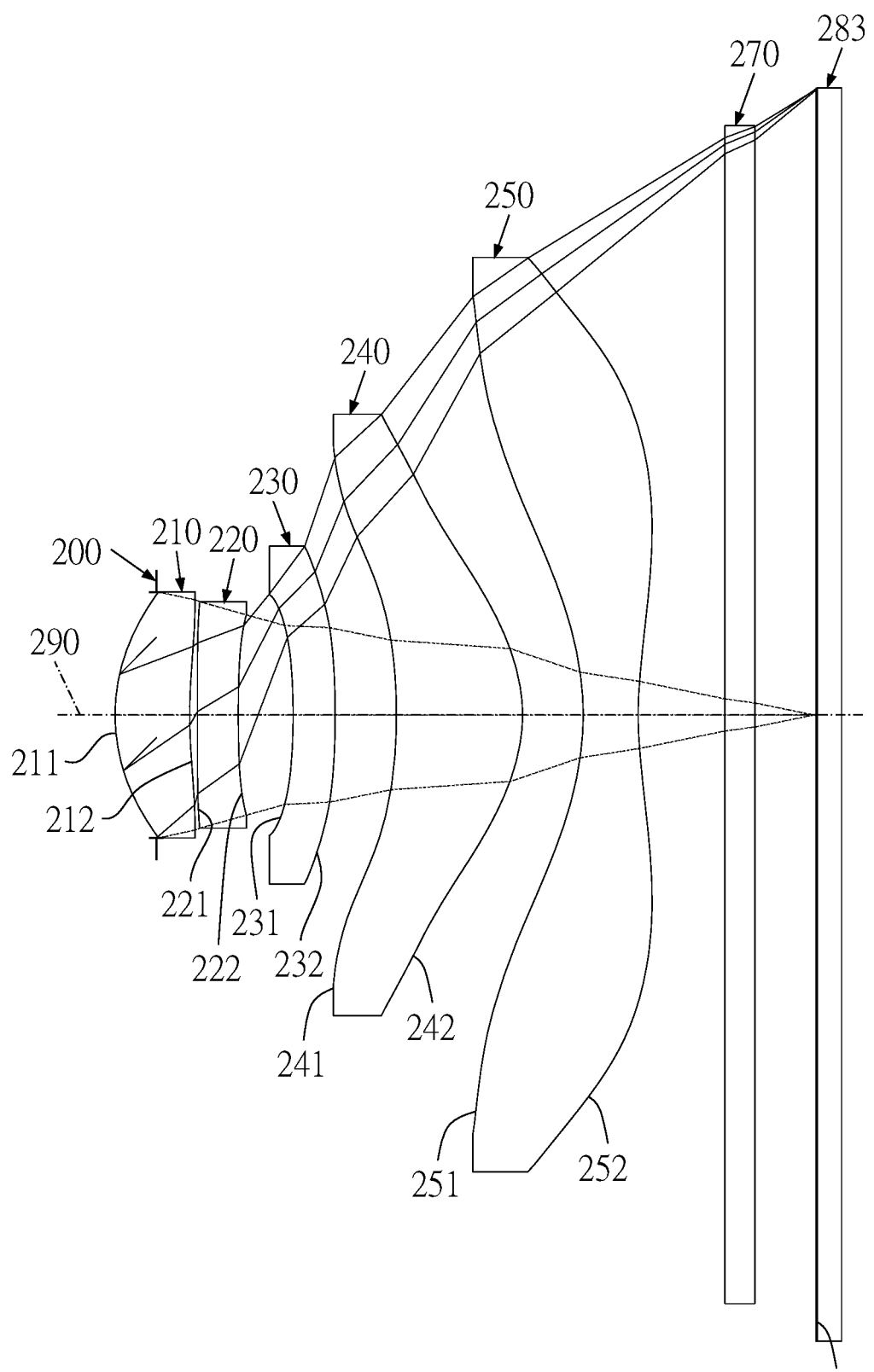
FIG. 2A is a schematic view of an optical lens assembly in accordance with a second embodiment of the present invention.
Figure 2B:
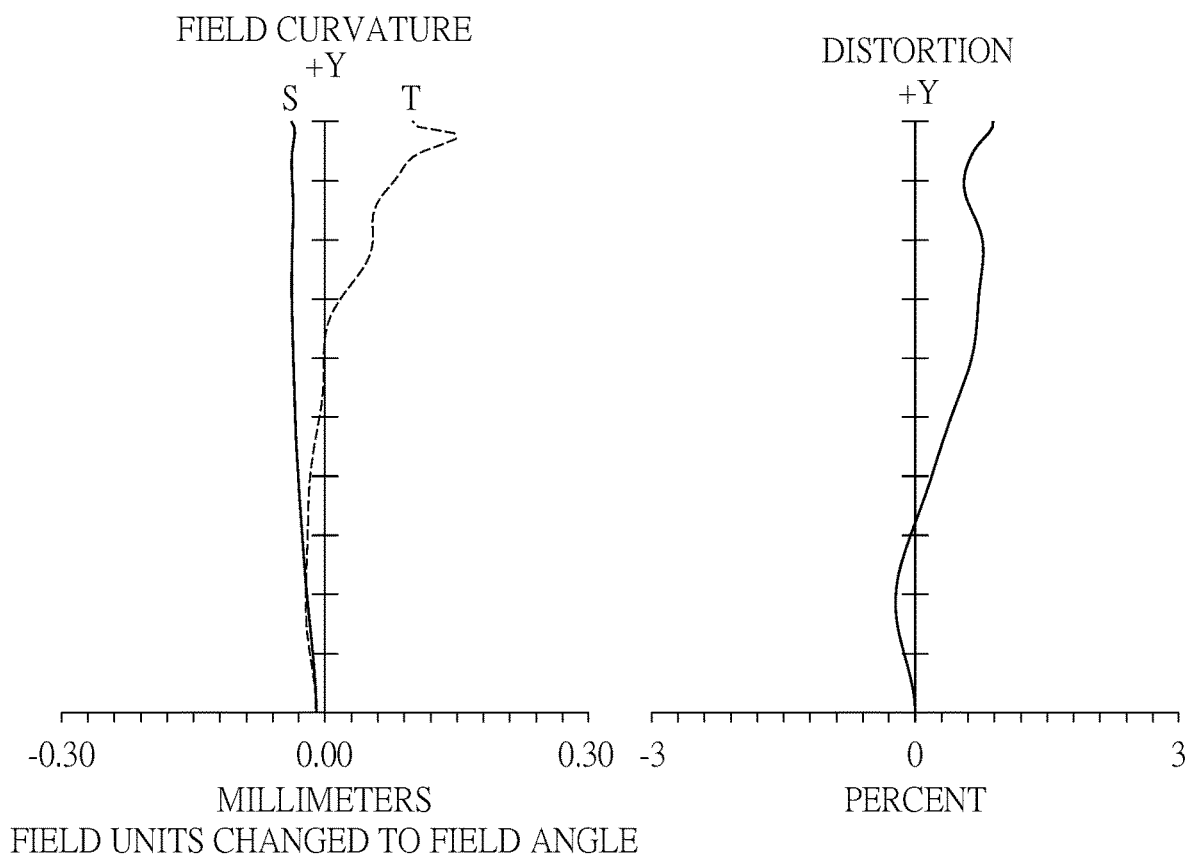
FIG. 2B is a schematic diagram showing, in order from left to right, the field curvature curve and the distortion curve of the second embodiment of the present invention.

Referring to FIGS. 2A and 2B, FIG. 2A shows a schematic view of an optical lens assembly in accordance with a second embodiment of the present invention, and FIG. 2B shows, in order from left to right, the field curvature curve and the distortion curve of the second embodiment of the present invention. As shown in FIG. 2A, the optical lens assembly includes, in order from an object side to an image side along an optical axis 290: a stop 200, a first lens 210, a second lens 220, a third lens 230, a fourth lens 240, a fifth lens 250, an optical filter 270, and an image plane 281. The optical lens assembly can cooperate with an image sensor 283 disposed on an image plane 281. The optical lens assembly has a total of five lenses with refractive power, but not is limited thereto.

The first lens 210 with positive refractive power includes an object-side surface 211 and an image-side surface 212, the object-side surface 211 of the first lens 210 is convex in a paraxial region thereof, the image-side surface 212 of the first lens 210 is concave in a paraxial region thereof, the object-side surface 211 and the image-side surface 212 of the first lens 210 are aspheric, and the first lens 210 is made of plastic.

The second lens 220 with negative refractive power includes an object-side surface 221 and an image-side surface 222, the object-side surface 221 of the second lens 220 is convex in a paraxial region thereof, the image-side surface 222 of the second lens 220 is concave in a paraxial region thereof, the object-side surface 221 and the image-side surface 222 of the second lens 220 are aspheric, and the second lens 220 is made of plastic.

The third lens 230 with negative refractive power includes an object-side surface 231 and an image-side surface 232, the object-side surface 231 of the third lens 230 is concave in a paraxial region thereof, the image-side surface 232 of the third lens 230 is convex in a paraxial region thereof, the object-side surface 231 and the image-side surface 232 of the third lens 230 are aspheric, and the third lens 230 is made of plastic.

The fourth lens 240 with positive refractive power includes an object-side surface 241 and an image-side surface 242, the object-side surface 241 of the fourth lens 240 is concave in a paraxial region thereof, the image-side surface 242 of the fourth lens 240 is convex in a paraxial region thereof, the object-side surface 241 and the image-side surface 242 of the fourth lens 240 are aspheric, and the fourth lens 240 is made of plastic.

The fifth lens 250 with negative refractive power includes an object-side surface 251 and an image-side surface 252, the object-side surface 251 of the fifth lens 250 is concave in a paraxial region thereof, the image-side surface 252 of the fifth lens 250 is concave in a paraxial region thereof, the object-side surface 251 and the image-side surface 252 of the fifth lens 250 are aspheric, and the fifth lens 250 is made of plastic.

The optical filter 270 is made of glass, is located between the fifth lens 250 and the image plane 281, and has no influence on the focal length of the optical lens assembly. In the present embodiment, the optical filter 270 is selected from IR-cut filters that allow light in the visible light wavelengths to pass therethrough.

The detailed optical data of the respective elements in the optical lens assembly of the second embodiment is shown in Table 4, and the aspheric coefficients of the lenses in the second embodiment is shown in Tables 5.

TABLE 4

Embodiment 2
f = 3.00 mm, Fno = 2.48, FOV = 90.76°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | Stop | Infinity | | −0.200 | | | | |
| 2 | First lens | 0.943 | (ASP) | 0.362 | plastic | 1.545 | 56.0 | 2.373 |
| 3 | | 2.991 | (ASP) | 0.038 | | | | |
| 4 | Second lens | 66.002 | (ASP) | 0.200 | plastic | 1.671 | 19.2 | −11.753 |
| 5 | | 7.097 | (ASP) | 0.267 | | | | |
| 6 | Third lens | −3.615 | (ASP) | 0.206 | plastic | 1.661 | 20.4 | −24.850 |
| 7 | | −4.729 | (ASP) | 0.299 | | | | |
| 8 | Fourth lens | −2.809 | (ASP) | 0.614 | plastic | 1.545 | 56.0 | 1.950 |
| 9 | | −0.832 | (ASP) | 0.296 | | | | |
| 10 | Fifth lens | −1.418 | (ASP) | 0.268 | plastic | 1.545 | 56.0 | −1.515 |
| 11 | | 2.119 | (ASP) | 0.424 | | | | |
| 12 | Optical filter | Infinity | | 0.145 | glass | 1.517 | 64.2 | |
| 13 | | Infinity | | 0.300 | | | | |
| 14 | Image plane | Infinity | | — | | | | |

The reference wavelength is 555 nm.

TABLE 5

Embodiment 2
Aspheric Coefficients

| Surface | 2 | 3 | 4 | 5 | 6 |
|---|---|---|---|---|---|
| K: | −8.2076E−01 | −9.5608E+01 | 1.0004E+02 | 3.5607E+01 | 3.5457E+01 |
| A2: | 0.0000E+00 | 0.0000E+00 | 0.0000E+00 | 0.0000E+00 | 0.0000E+00 |
| A4: | 2.6084E−02 | 3.6235E−01 | −5.4675E−02 | 6.0494E−02 | −1.6673E−01 |
| A6: | 1.9388E+00 | −4.8791E+00 | 1.7821E+00 | 4.8500E+00 | −2.3091E+00 |
| A8: | −1.9227E+01 | 4.3276E+01 | −2.2844E+01 | −6.2069E+01 | 2.9439E+01 |
| A10: | 1.3214E+02 | −2.9022E+02 | 2.0556E+02 | 5.0623E+02 | −2.0019E+02 |
| A12: | −6.5346E+02 | 1.2299E+03 | −1.1929E+03 | −2.3876E+03 | 6.8982E+02 |
| A14: | 2.2208E+03 | −3.1892E+03 | 4.5296E+03 | 6.3863E+03 | −5.5244E+02 |
| A16: | −4.8070E+03 | 4.8166E+03 | −1.0725E+04 | −8.3594E+03 | −3.7531E+03 |
| A18: | 5.7978E+03 | −3.8454E+03 | 1.4262E+04 | 2.2204E+03 | 1.1736E+04 |
| A20: | −2.9595E+03 | 1.3165E+03 | −7.9974E+03 | 3.5790E+03 | −1.0577E+04 |

| Surface | 7 | 8 | 9 | 10 | 11 |
|---|---|---|---|---|---|
| K: | 6.8880E+00 | 9.0068E−01 | −2.6880E+00 | −1.0994E+01 | −2.8092E+01 |
| A2 | 0.0000E+00 | 0.0000E+00 | 0.0000E+00 | 0.0000E+00 | 0.0000E+00 |
| A4: | −2.3960E−01 | −1.4428E−01 | −4.2948E−02 | −2.0517E−01 | −7.9596E−02 |
| A6: | 3.8865E−02 | 2.7951E−03 | −2.0548E−01 | 1.9702E−01 | −2.9179E−03 |
| A8: | −6.4364E−01 | 4.7068E−02 | 5.1707E−01 | −6.4885E−02 | 5.1111E−02 |
| A10: | 6.1870E+00 | 2.4178E−01 | −4.2332E−01 | −1.1911E−02 | −5.3516E−02 |
| A12: | −2.2560E+01 | −3.2285E−01 | 2.0830E−01 | 1.9052E−02 | 2.8983E−02 |
| A14: | 4.6095E+01 | 1.5835E−01 | −1.1181E−01 | −7.7133E−03 | −9.2631E−03 |
| A16: | −4.9610E+01 | −3.7077E−02 | 5.7917E−02 | 1.6209E−03 | 1.7434E−03 |
| A18: | 2.3182E+01 | 5.1293E−03 | −1.7005E−02 | −1.8026E−04 | −1.7768E−04 |
| A20: | −2.7019E+00 | −5.5886E−04 | 1.9503E−03 | 8.4122E−06 | 7.5381E−06 |

TABLE 6

Embodiment 2

| EPD[°] | 1.21 | TL[mm] | 3.42 | BFL[mm] | 0.87 |
|---|---|---|---|---|---|
| IMH[mm] | 3.08 | TDP7[mm] | 0.31 | HFOV[°] | 45.38 |
| CRA8[°] | 37.05 | TDP8[mm] | 0.69 | TDP10[mm] | 0.54 |

In the second embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Table 4-6 as the following values, and the following conditions in the following table are satisfied.

TABLE 7

Embodiment 2

| CRA8*BFL/(CT2 + CT3) [°] | 79.30 | HFOV/TL [°/mm] | 13.28 |
|---|---|---|---|
| TL/IMH | 1.11 | TDP7*R6[mm$^2$] | −1.45 |
| (R5 + R6)/(R1 + R2) | −2.12 | CRA8/R4[°/mm] | 5.22 |
| TDP8*(R5 + R6) [mm$^2$] | −5.74 | Vd1 + Vd2 | 75.23 |
| TDP8*R5[mm$^2$] | −2.49 | EPD*(R4 + R5) [mm$^2$] | 4.21 |

TABLE 7-continued

Embodiment 2

| | | | |
|---|---|---|---|
| f2/EPD | −9.71 | HFOV/(EPD*R10)[°/mm$^{-2}$] | 17.70 |
| R6/R7 | 1.68 | TDP10*(R9 + R10) [mm$^2$] | 0.38 |
| R4/R5 | −1.96 | — | — |

Third Embodiment

Figure 3A:
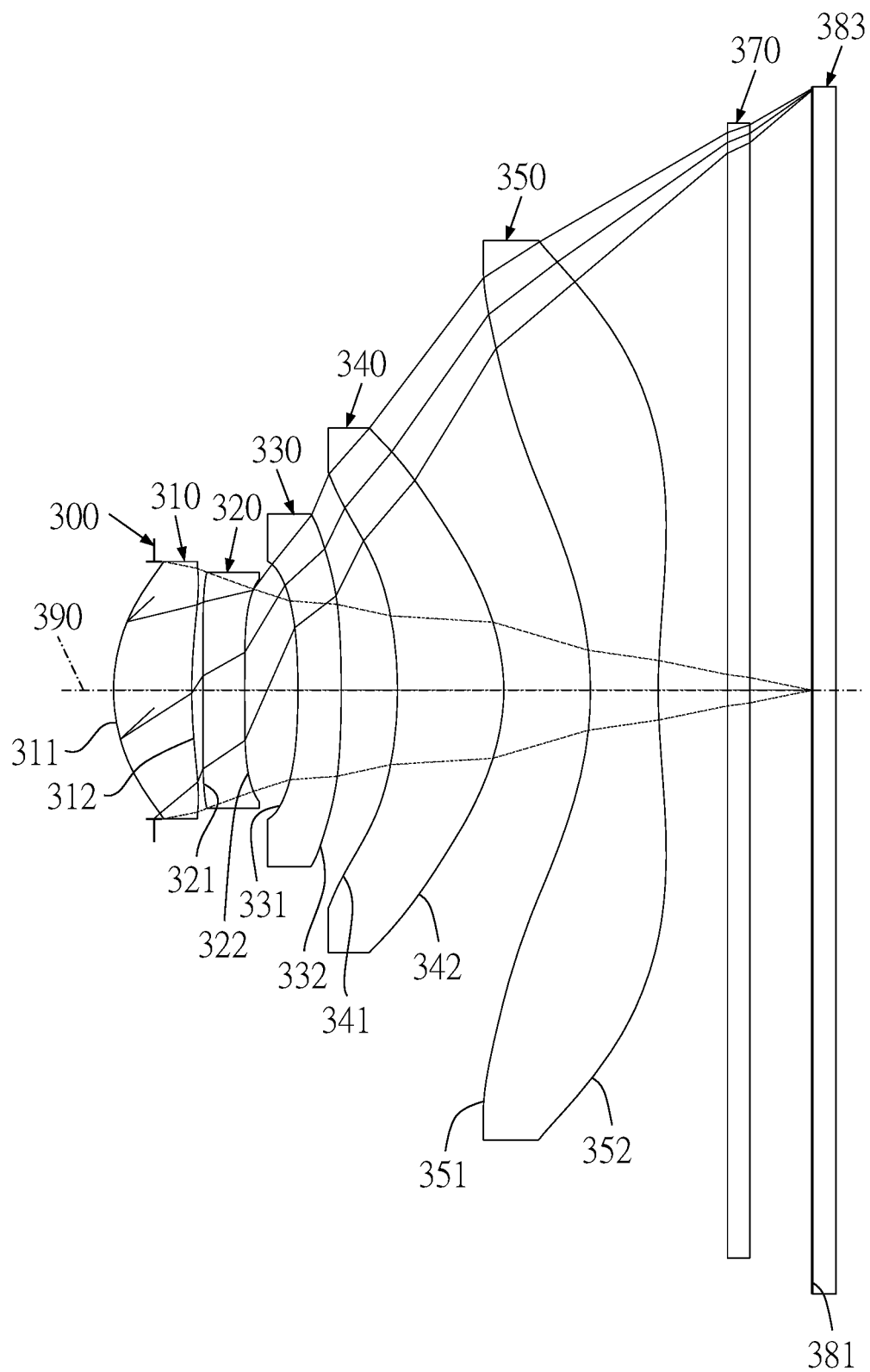
FIG. 3A is a schematic view of an optical lens assembly in accordance with a third embodiment of the present invention.
Figure 3B:
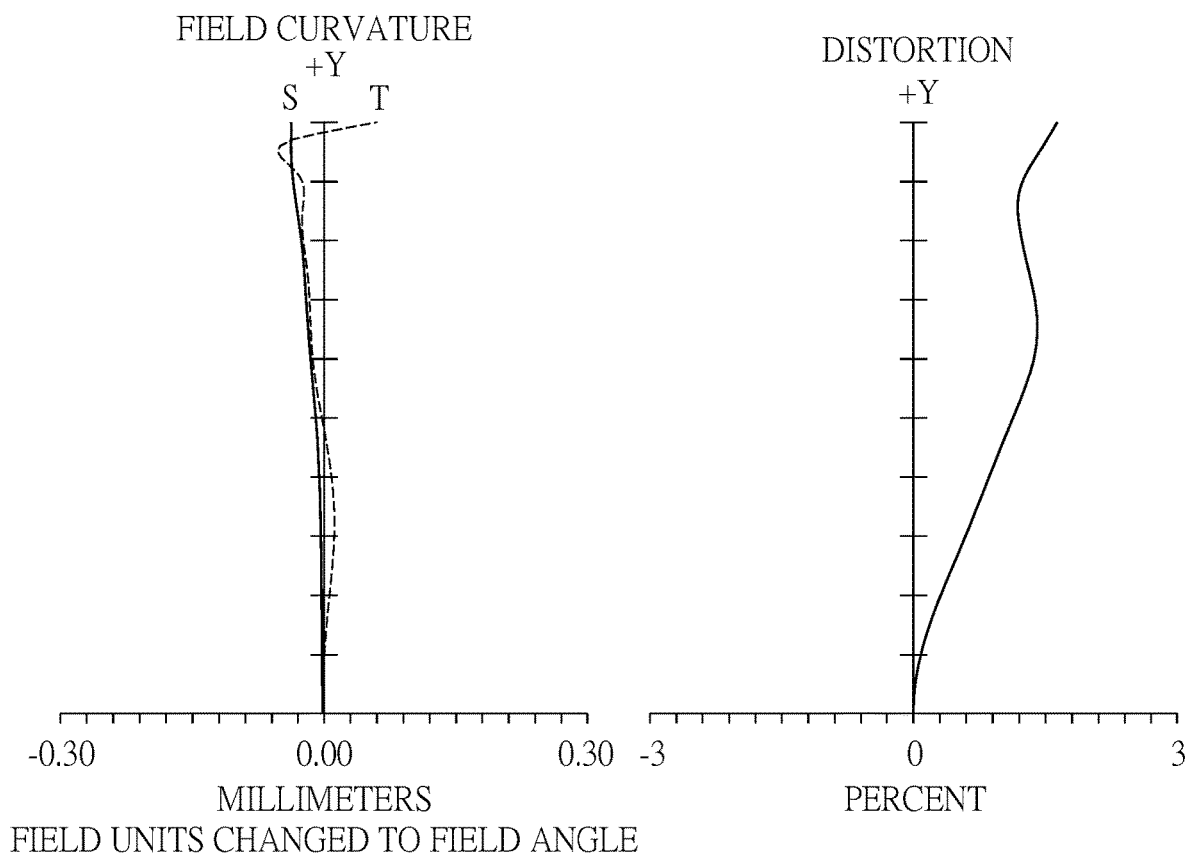
FIG. 3B is a schematic diagram showing, in order from left to right, the field curvature curve and the distortion curve of the third embodiment of the present invention.

Referring to FIGS. 3A and 3B, FIG. 3A shows a schematic view of an optical lens assembly in accordance with a third embodiment of the present invention, and FIG. 3B shows, in order from left to right, the field curvature curve and the distortion curve of the third embodiment of the present invention. As shown in FIG. 3A, the optical lens assembly includes, in order from an object side to an image side along an optical axis 390: a stop 300, a first lens 310, a second lens 320, a third lens 330, a fourth lens 340, a fifth lens 350, an optical filter 370, and an image plane 381. The optical lens assembly can cooperate with an image sensor 383 disposed on an image plane 381. The optical lens assembly has a total of five lenses with refractive power, but not is limited thereto.

The first lens 310 with positive refractive power includes an object-side surface 311 and an image-side surface 312, the object-side surface 311 of the first lens 310 is convex in a paraxial region thereof, the image-side surface 312 of the first lens 310 is concave in a paraxial region thereof, the object-side surface 311 and the image-side surface 312 of the first lens 310 are aspheric, and the first lens 310 is made of plastic.

The second lens 320 with negative refractive power includes an object-side surface 321 and an image-side surface 322, the object-side surface 321 of the second lens 320 is concave in a paraxial region thereof, the image-side surface 322 of the second lens 320 is concave in a paraxial region thereof, the object-side surface 321 and the image-side surface 322 of the second lens 320 are aspheric, and the second lens 320 is made of plastic.

The third lens 330 with negative refractive power includes an object-side surface 331 and an image-side surface 332, the object-side surface 331 of the third lens 330 is concave in a paraxial region thereof, the image-side surface 332 of the third lens 330 is convex in a paraxial region thereof, the object-side surface 331 and the image-side surface 332 of the third lens 330 are aspheric, and the third lens 330 is made of plastic.

The fourth lens 340 with positive refractive power includes an object-side surface 341 and an image-side surface 342, the object-side surface 341 of the fourth lens 340 is concave in a paraxial region thereof, the image-side surface 342 of the fourth lens 340 is convex in a paraxial region thereof, the object-side surface 341 and the image-side surface 342 of the fourth lens 340 are aspheric, and the fourth lens 340 is made of plastic.

The fifth lens 350 with negative refractive power includes an object-side surface 351 and an image-side surface 352, the object-side surface 351 of the fifth lens 350 is concave in a paraxial region thereof, the image-side surface 352 of the fifth lens 350 is concave in a paraxial region thereof, the object-side surface 351 and the image-side surface 352 of the fifth lens 350 are aspheric, and the fifth lens 350 is made of plastic.

The optical filter 370 is made of glass, is located between the fifth lens 350 and the image plane 381, and has no influence on the focal length of the optical lens assembly. In the present embodiment, the optical filter 370 is selected from IR-cut filters that allow light in the visible light wavelengths to pass therethrough.

The detailed optical data of the respective elements in the optical lens assembly of the third embodiment is shown in Table 8, and the aspheric coefficients of the lenses in the third embodiment is shown in Tables 9.

TABLE 8

Embodiment 3
f = 3.10 mm, Fno = 2.46, FOV = 85.99°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | Stop | Infinity | | −0.197 | | | | |
| 2 | First lens | 0.886 | (ASP) | 0.378 | plastic | 1.545 | 56.0 | 2.29 |
| 3 | | 2.574 | (ASP) | 0.055 | | | | |
| 4 | Second lens | −41.434 | (ASP) | 0.201 | plastic | 1.681 | 18.2 | −15.67 |
| 5 | | 14.595 | (ASP) | 0.260 | | | | |
| 6 | Third lens | −3.938 | (ASP) | 0.208 | plastic | 1.671 | 19.2 | −11.86 |
| 7 | | −7.888 | (ASP) | 0.274 | | | | |
| 8 | Fourth lens | −2.167 | (ASP) | 0.514 | plastic | 1.566 | 37.4 | 3.03 |
| 9 | | −1.042 | (ASP) | 0.418 | | | | |
| 10 | Fifth lens | −1.880 | (ASP) | 0.330 | plastic | 1.545 | 56.0 | −2.14 |
| 11 | | 3.273 | (ASP) | 0.333 | | | | |
| 12 | Optical filter | Infinity | | 0.110 | glass | 1.517 | 64.2 | |
| 13 | | Infinity | | 0.300 | | | | |
| 14 | Image plane | Infinity | | — | | | | |

The reference wavelength is 555 nm.

TABLE 9

Embodiment 3
Aspheric Coefficients

| Surface | 2 | 3 | 4 | 5 | 6 |
|---|---|---|---|---|---|
| K: | −3.7275E+00 | −8.1135E+00 | 9.0001E+01 | 3.5161E+01 | 3.7018E+01 |
| A2: | 0.0000E+00 | 0.0000E+00 | 0.0000E+00 | 0.0000E+00 | 0.0000E+00 |
| A4: | 7.4506E−01 | 5.1893E−02 | 1.2915E−02 | 3.3041E−01 | −3.1369E−01 |
| A6: | −1.5399E+00 | −3.2037E+00 | 1.1303E+00 | −5.4459E−01 | −1.6649E−01 |
| A8: | 7.0623E+00 | 3.5453E+01 | −5.3803E+00 | 1.6585E+01 | 2.4314E+00 |
| A10: | −1.9317E+01 | −2.3566E+02 | 1.3344E+01 | −1.0552E+02 | −1.6930E+01 |
| A12: | 2.7233E+00 | 7.2215E+02 | 2.7186E+01 | 3.3667E+02 | 6.5287E+01 |
| A14: | 8.3768E+01 | −2.3483E+02 | −1.6361E+02 | 4.6278E+02 | −1.2491E+02 |
| A16: | 1.8347E+00 | −4.8083E+03 | 1.2787E+01 | −6.8323E+03 | −1.4732E+01 |
| A18: | −6.3222E+02 | 1.2522E+04 | 8.8560E+02 | 1.8830E+04 | 6.2310E+02 |
| A20: | 7.7417E+02 | −1.0022E+04 | −9.9688E+02 | −1.6511E+04 | −1.0313E+03 |

| Surface | 7 | 8 | 9 | 10 | 11 |
|---|---|---|---|---|---|
| K: | 7.6518E+01 | 1.7178E+00 | −4.0734E−01 | −2.9668E−01 | −2.3663E+01 |
| A2 | 0.0000E+00 | 0.0000E+00 | 0.0000E+00 | 0.0000E+00 | 0.0000E+00 |
| A4 | −2.3934E−01 | −1.0098E−01 | 1.4367E−01 | −2.2010E−03 | −1.3614E−01 |
| A6: | 6.2109E−02 | −3.9912E−02 | −2.2287E−03 | 3.7320E−02 | 9.0109E−02 |
| A8: | −9.0392E−01 | 3.7193E−01 | −8.2186E−02 | 7.8394E−03 | −4.6887E−02 |
| A10: | 7.1862E+00 | −1.9136E+00 | 2.3278E−01 | −1.3080E−02 | 1.5196E−02 |
| A12: | −2.7194E+01 | 3.6170E+00 | −1.7033E−01 | 4.3813E−03 | −3.0390E−03 |
| A14: | 6.4126E+01 | −1.8564E+00 | 5.5211E−02 | −5.9274E−04 | 3.7830E−04 |
| A16: | −8.5359E+01 | −1.2075E+00 | −3.2427E−02 | 1.8982E−05 | −2.9670E−05 |
| A18: | 5.6206E+01 | 1.5072E+00 | 1.9087E−02 | 2.2219E−06 | 1.3265E−06 |
| A20: | −1.3834E+01 | −4.0709E−01 | −2.7883E−03 | −7.2500E−08 | −6.9000E−09 |

TABLE 10

Embodiment 3

| EPD[°] | 1.26 | TL[mm] | 3.38 | BFL[mm] | 0.74 |
|---|---|---|---|---|---|
| IMH[mm] | 2.93 | TDP7[mm] | 0.34 | HFOV[°] | 43.00 |
| CRA8[°] | 35.71 | TDP8[mm] | 0.65 | TDP10[mm] | 0.58 |

In the third embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 8-10 as the following values, and the following conditions in the following table are satisfied.

TABLE 11

Embodiment 3

| CRA8*BFL/(CT2 + CT3) [°] | 64.96 | HFOV/TL [°/mm] | 12.72 |
|---|---|---|---|
| TL/IMH | 1.15 | TDP7*R6[mm$^2$] | −2.64 |
| (R5 + R6)/(R1 + R2) | −3.42 | CRA8/R4[°/mm] | 2.45 |
| TDP8*(R5 + R6) [mm$^2$] | −7.68 | Vd1 + Vd2 | 74.14 |
| TDP8*R5[mm$^2$] | −2.56 | EPD*(R4 + R5) [mm$^2$] | 13.41 |
| f2/EPD | −12.45 | HFOV/(EPD*R10)[°/mm$^{−2}$] | 10.44 |
| R6/R7 | 3.64 | TDP10*(R9 + R10) [mm$^2$] | 0.81 |
| R4/R5 | −3.71 | — | — |

Fourth Embodiment

Figure 4A:
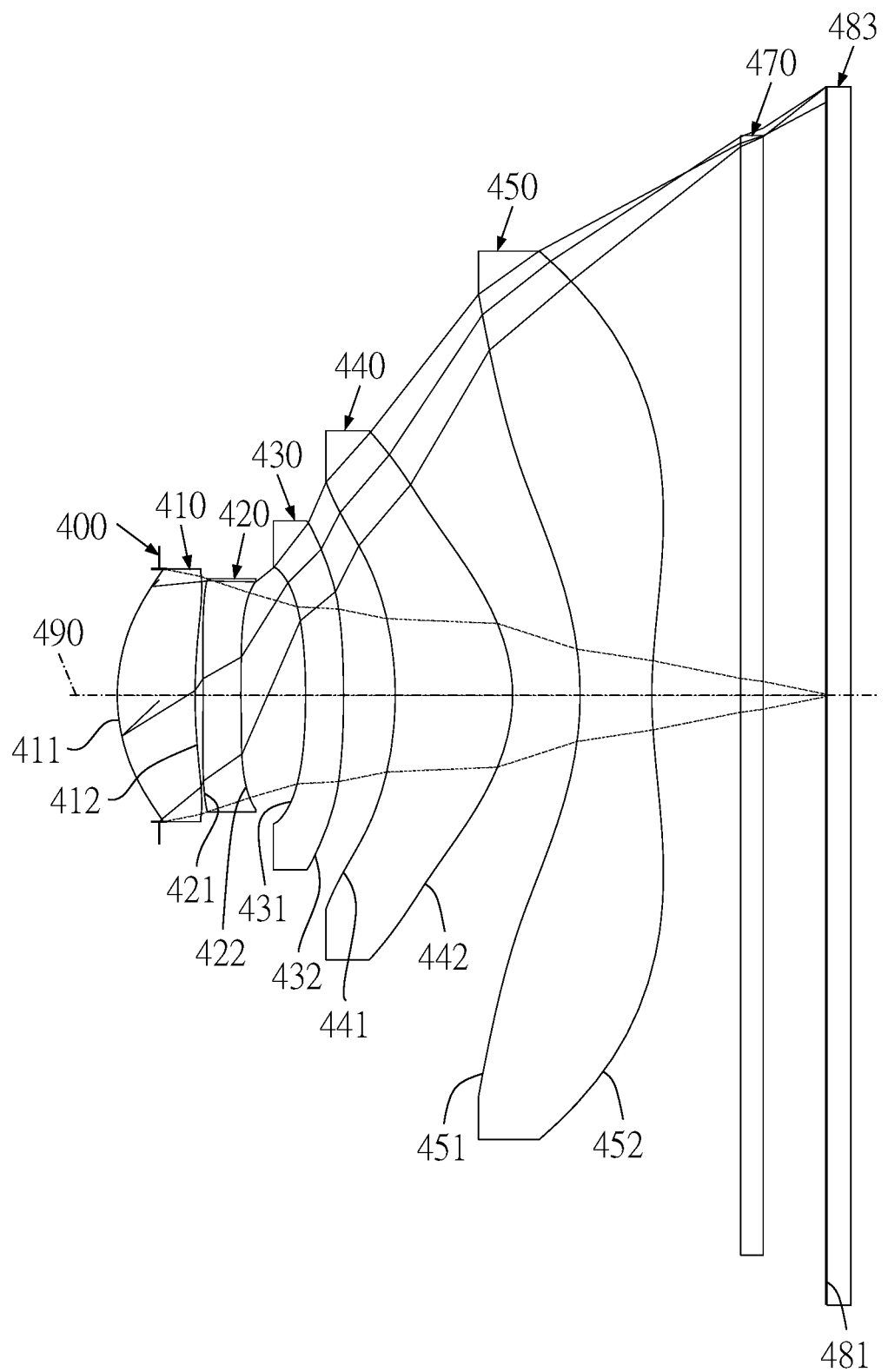
FIG. 4A is a schematic view of an optical lens assembly in accordance with a fourth embodiment of the present invention.
Figure 4B:
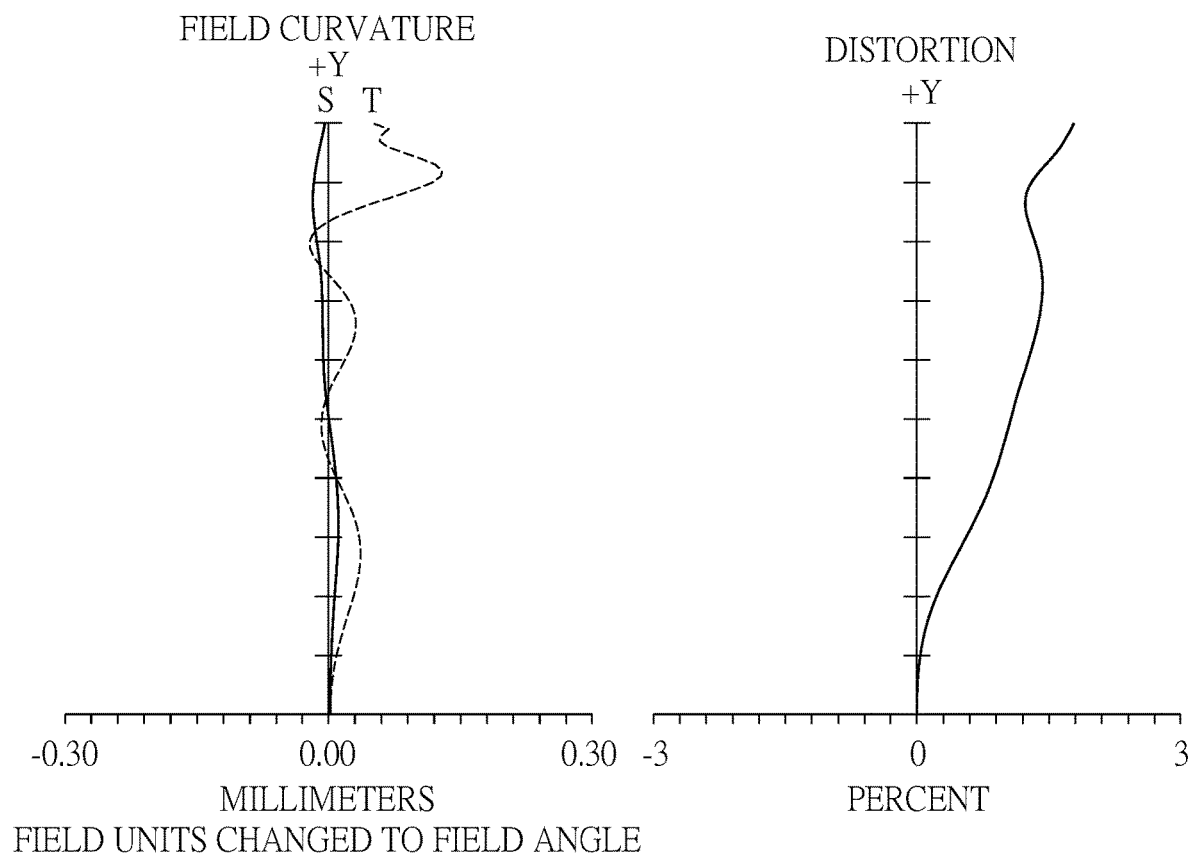
FIG. 4B is a schematic diagram showing, in order from left to right, the field curvature curve and the distortion curve of the fourth embodiment of the present invention.

Referring to FIGS. 4A and 4B, FIG. 4A shows a schematic view of an optical lens assembly in accordance with a fourth embodiment of the present invention, and FIG. 4B shows, in order from left to right, the field curvature curve and the distortion curve of the fourth embodiment of the present invention. As shown in FIG. 4A, the optical lens assembly includes, in order from an object side to an image side along an optical axis 490: a stop 400, a first lens 410, a second lens 420, a third lens 430, a fourth lens 440, a fifth lens 450, an optical filter 470, and an image plane 481. The optical lens assembly can cooperate with an image sensor 483 disposed on an image plane 481. The optical lens assembly has a total of five lenses with refractive power, but not is limited thereto.

The first lens 410 with positive refractive power includes an object-side surface 411 and an image-side surface 412, the object-side surface 411 of the first lens 410 is convex in a paraxial region thereof, the image-side surface 412 of the first lens 410 is concave in a paraxial region thereof, the object-side surface 411 and the image-side surface 412 of the first lens 410 are aspheric, and the first lens 410 is made of plastic.

The second lens 420 with negative refractive power includes an object-side surface 421 and an image-side surface 422, the object-side surface 421 of the second lens 420 is concave in a paraxial region thereof, the image-side surface 422 of the second lens 420 is concave in a paraxial region thereof, the object-side surface 421 and the image-side surface 422 of the second lens 420 are aspheric, and the second lens 420 is made of plastic.

The third lens 430 with negative refractive power includes an object-side surface 431 and an image-side surface 432, the object-side surface 431 of the third lens 430 is concave in a paraxial region thereof, the image-side surface 432 of the third lens 430 is convex in a paraxial region thereof, the object-side surface 431 and the image-side surface 432 of the third lens 430 are aspheric, and the third lens 430 is made of plastic.

The fourth lens 440 with positive refractive power includes an object-side surface 441 and an image-side surface 442, the object-side surface 441 of the fourth lens 440 is concave in a paraxial region thereof, the image-side surface 442 of the fourth lens 440 is convex in a paraxial region thereof, the object-side surface 441 and the image-side surface 442 of the fourth lens 440 are aspheric, and the fourth lens 440 is made of plastic.

The fifth lens 450 with negative refractive power includes an object-side surface 451 and an image-side surface 452, the object-side surface 451 of the fifth lens 450 is concave in a paraxial region thereof, the image-side surface 452 of the fifth lens 450 is concave in a paraxial region thereof, the object-side surface 451 and the image-side surface 452 of the fifth lens 450 are aspheric, and the fifth lens 450 is made of plastic.

The optical filter 470 is made of glass, is located between the fifth lens 450 and the image plane 481, and has no influence on the focal length of the optical lens assembly. In the present embodiment, the optical filter 470 is selected from IR-cut filters that allow light in the visible light wavelengths to pass therethrough.

The detailed optical data of the respective elements in the optical lens assembly of the fourth embodiment is shown in Table 12, and the aspheric coefficients of the lenses in the fourth embodiment is shown in Tables 13.

TABLE 12

Embodiment 4
f = 3.01 mm, Fno = 2.47, FOV = 87.57°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | Stop | Infinity | | −0.200 | | | | |
| 2 | First lens | 0.905 | (ASP) | 0.371 | plastic | 1.545 | 56.0 | 2.33 |
| 3 | | 2.665 | (ASP) | 0.039 | | | | |
| 4 | Second lens | −24.945 | (ASP) | 0.181 | plastic | 1.671 | 19.2 | −14.92 |
| 5 | | 17.042 | (ASP) | 0.308 | | | | |
| 6 | Third lens | −3.494 | (ASP) | 0.181 | plastic | 1.671 | 19.2 | −15.59 |
| 7 | | −5.330 | (ASP) | 0.245 | | | | |
| 8 | Fourth lens | −1.892 | (ASP) | 0.561 | plastic | 1.545 | 56.0 | 2.20 |
| 9 | | −0.812 | (ASP) | 0.326 | | | | |
| 10 | Fifth lens | −1.680 | (ASP) | 0.343 | plastic | 1.545 | 56.0 | −1.76 |
| 11 | | 2.415 | (ASP) | 0.422 | | | | |
| 12 | Optical filter | Infinity | | 0.110 | glass | 1.517 | 64.2 | |
| 13 | | Infinity | | 0.300 | | | | |
| 14 | Image plane | Infinity | | — | | | | |

The reference wavelength is 555 nm.

TABLE 13

Embodiment 4
Aspheric Coefficients

| Surface | 2 | 3 | 4 | 5 | 6 |
|---|---|---|---|---|---|
| K: | −6.8197E+00 | −6.3828E−01 | 9.9712E+01 | −1.2896E+02 | 3.0811E+01 |
| A2: | 0.0000E+00 | 0.0000E+00 | 0.0000E+00 | 0.0000E+00 | 0.0000E+00 |
| A4: | 1.0927E+00 | −1.3716E−01 | 9.5684E−02 | 2.4572E−01 | −4.4765E−01 |
| A6: | −2.2072E+00 | −1.0691E−01 | 7.6442E−01 | 2.4537E+00 | 3.5907E+00 |
| A8: | 4.1651E+00 | −5.0718E+00 | −6.7473E+00 | −1.6593E+01 | −3.9342E+01 |
| A10: | −5.9615E+00 | 4.1729E+01 | 5.6368E+01 | 8.8738E+01 | 2.4203E+02 |
| A12: | 1.2343E+01 | −1.7007E+02 | −2.1524E+02 | −1.8910E+02 | −8.6609E+02 |
| A14: | −3.2619E+01 | 2.9936E+02 | 3.7236E+02 | 2.8321E+01 | 1.6557E+03 |
| A16: | 1.1007E+01 | −1.7809E+02 | −2.0511E+02 | 3.6734E+02 | −1.3012E+03 |
| A18: | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 |

| Surface | 7 | 8 | 9 | 10 | 11 |
|---|---|---|---|---|---|
| K: | 3.8109E+01 | 1.7525E+00 | −1.1669E+00 | −3.9210E−01 | −2.4520E+01 |
| A2: | 0.0000E+00 | 0.0000E+00 | 0.0000E+00 | 0.0000E+00 | 0.0000E+00 |
| A4: | −2.4522E−01 | −2.0315E−01 | 5.5586E−02 | 3.8478E−02 | −1.2509E−01 |
| A6: | 7.1326E−02 | 3.8543E−01 | 7.8718E−02 | 2.4353E−02 | 7.8906E−02 |
| A8: | 2.1857E+00 | 4.3253E−01 | −4.3041E−01 | 1.7526E−02 | −4.2296E−02 |
| A10: | −1.5996E+01 | −3.4724E+00 | 1.2078E+00 | −2.2236E−02 | 1.4749E−02 |
| A12: | 4.2948E+01 | 6.2349E+00 | −1.3335E+00 | 8.5182E−03 | −3.1634E−03 |
| A14: | −4.9453E+01 | −4.5305E+00 | 6.3739E−01 | −1.4660E−03 | 3.7470E−04 |
| A16: | 2.1108E+01 | 1.1921E+00 | −1.1223E−01 | 9.8814E−05 | −1.8588E−05 |
| A18: | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 |

TABLE 14

Embodiment 4

| EPD[°] | 1.22 | TL[mm] | 3.39 | BFL[mm] | 0.83 |
|---|---|---|---|---|---|
| IMH[mm] | 2.93 | TDP7[mm] | 0.33 | HFOV[°] | 43.79 |
| CRA8[°] | 34.8 | TDP8[mm] | 0.68 | TDP10[mm] | 0.54 |

In the fourth embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 12-14 as the following values, and the following conditions in the following table are satisfied.

TABLE 15

Embodiment 4

| CRA8*BFL/(CT2 + CT3) [°] | 79.82 | HFOV/TL [°/mm] | 12.94 |
|---|---|---|---|
| TL/IMH | 1.15 | TDP7*R6[mm$^2$] | −1.76 |
| (R5 + R6)/(R1 + R2) | −2.47 | CRA8/R4[°/mm] | 2.04 |
| TDP8*(R5 + R6) [mm$^2$] | −6.03 | Vd1 + Vd2 | 75.23 |
| TDP8*R5[mm$^2$] | −2.39 | EPD*(R4 + R5) [mm$^2$] | 16.51 |
| f2/EPD | −12.24 | HFOV/(EPD*R10)[°/mm$^{-2}$] | 14.88 |
| R6/R7 | 2.82 | TDP10*(R9 + R10) [mm$^2$] | 0.40 |
| R4/R5 | −4.88 | — | — |

Fifth Embodiment

Figure 5A:
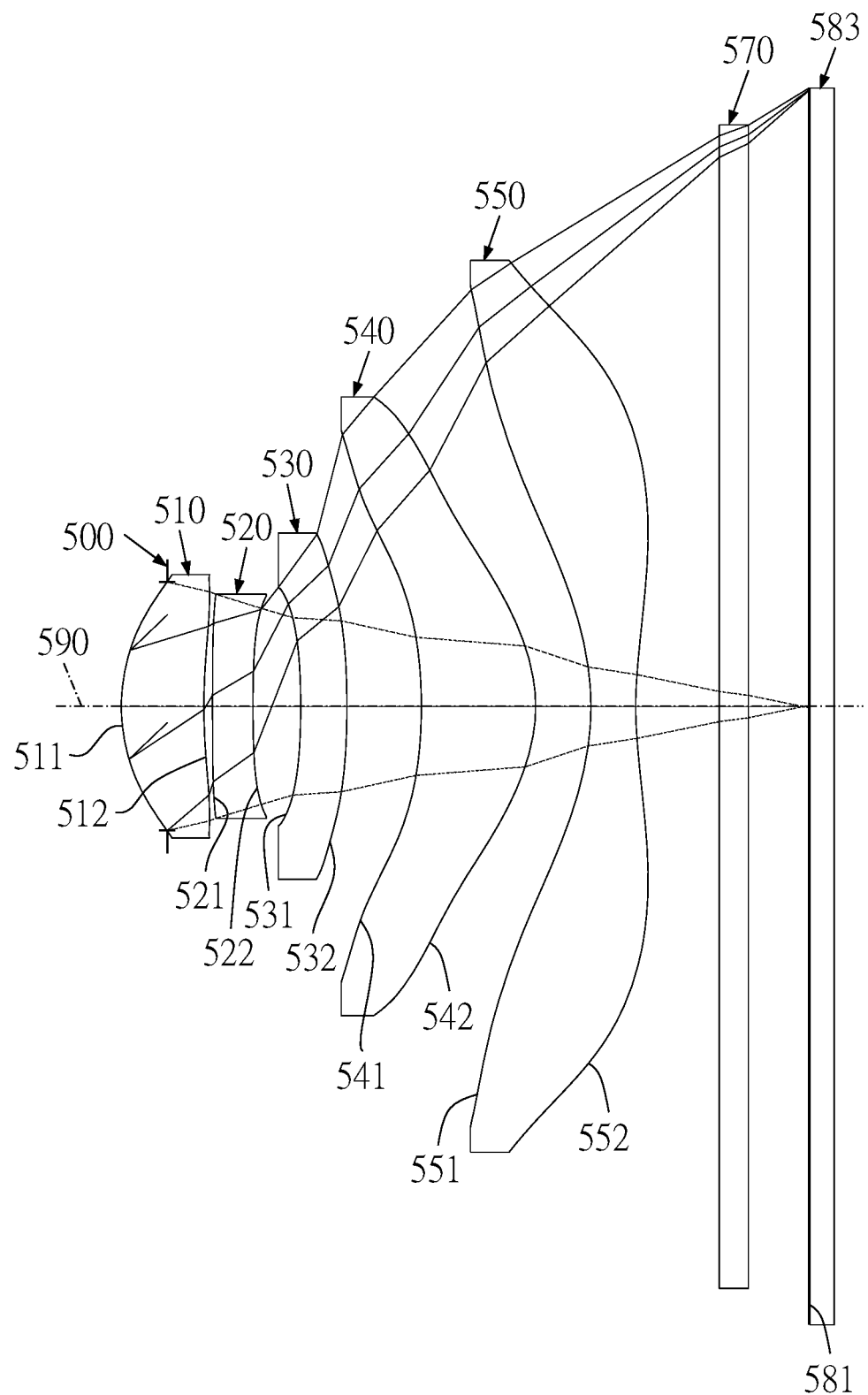
FIG. 5A is a schematic view of an optical lens assembly in accordance with a fifth embodiment of the present invention.
Figure 5B:
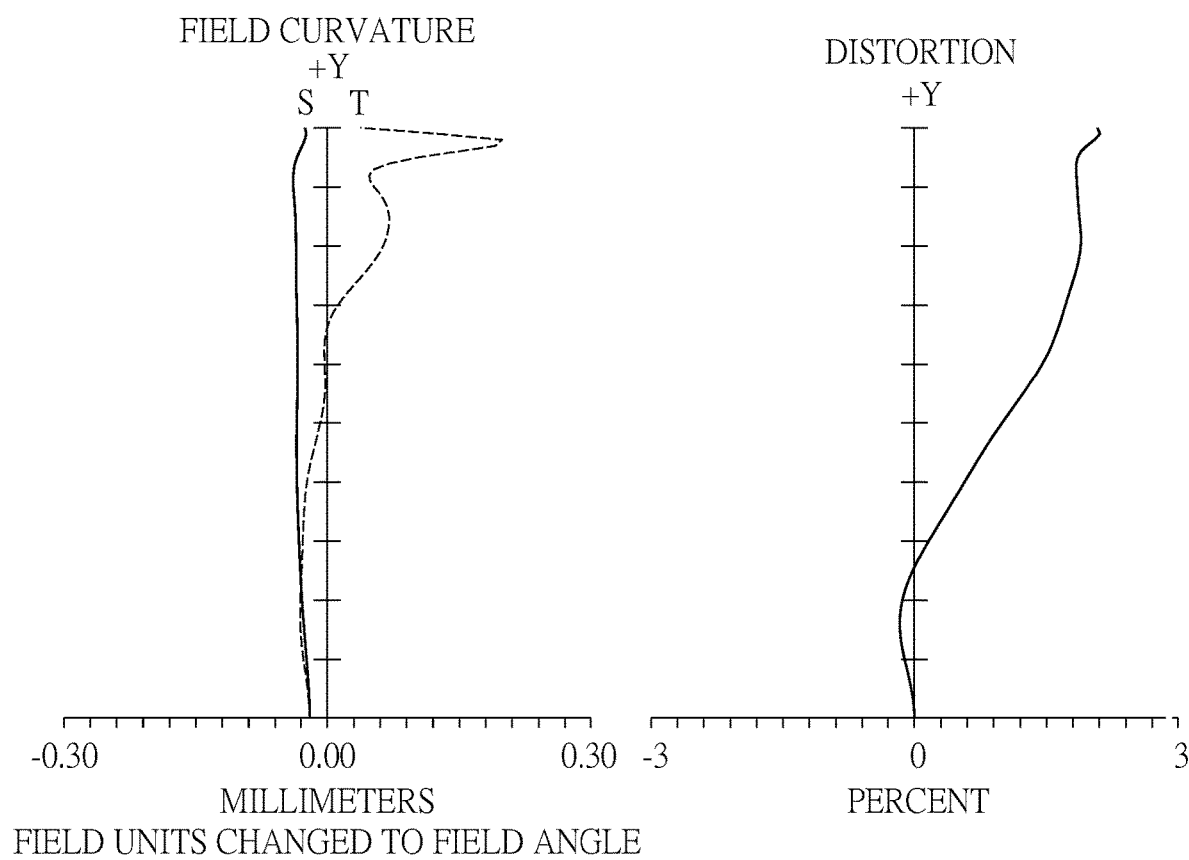
FIG. 5B is a schematic diagram showing, in order from left to right, the field curvature curve and the distortion curve of the fifth embodiment of the present invention.

Referring to FIGS. 5A and 5B, FIG. 5A shows a schematic view of an optical lens assembly in accordance with a fifth embodiment of the present invention, and FIG. 5B shows, in order from left to right, the field curvature curve and the distortion curve of the fifth embodiment of the present invention. As shown in FIG. 5A, the optical lens assembly includes, in order from an object side to an image side along an optical axis 590: a stop 500, a first lens 510, a second lens 520, a third lens 530, a fourth lens 540, a fifth lens 550, an optical filter 570, and an image plane 581. The optical lens assembly can cooperate with an image sensor 583 disposed on an image plane 581. The optical lens assembly has a total of five lenses with refractive power, but not is limited thereto.

The first lens 510 with positive refractive power includes an object-side surface 511 and an image-side surface 512, the object-side surface 511 of the first lens 510 is convex in a paraxial region thereof, the image-side surface 512 of the first lens 510 is concave in a paraxial region thereof, the object-side surface 511 and the image-side surface 512 of the first lens 510 are aspheric, and the first lens 510 is made of plastic.

The second lens 520 with negative refractive power includes an object-side surface 521 and an image-side surface 522, the object-side surface 521 of the second lens 520 is convex in a paraxial region thereof, the image-side surface 522 of the second lens 520 is concave in a paraxial region thereof, the object-side surface 521 and the image-side surface 522 of the second lens 520 are aspheric, and the second lens 520 is made of plastic.

The third lens 530 with negative refractive power includes an object-side surface 531 and an image-side surface 532, the object-side surface 531 of the third lens 530 is concave in a paraxial region thereof, the image-side surface 532 of the third lens 530 is convex in a paraxial region thereof, the object-side surface 531 and the image-side surface 532 of the third lens 530 are aspheric, and the third lens 530 is made of plastic.

The fourth lens 540 with positive refractive power includes an object-side surface 541 and an image-side surface 542, the object-side surface 541 of the fourth lens 540 is concave in a paraxial region thereof, the image-side surface 542 of the fourth lens 540 is convex in a paraxial region thereof, the object-side surface 541 and the image-side surface 542 of the fourth lens 540 are aspheric, and the fourth lens 540 is made of plastic.

The fifth lens 550 with negative refractive power includes an object-side surface 551 and an image-side surface 552, the object-side surface 551 of the fifth lens 550 is concave in a paraxial region thereof, the image-side surface 552 of the fifth lens 550 is concave in a paraxial region thereof, the object-side surface 551 and the image-side surface 552 of the fifth lens 550 are aspheric, and the fifth lens 550 is made of plastic.

The optical filter 570 is made of glass, is located between the fifth lens 550 and the image plane 581, and has no influence on the focal length of the optical lens assembly. In the present embodiment, the optical filter 570 is selected from IR-cut filters that allow light in the visible light wavelengths to pass therethrough.

The detailed optical data of the respective elements in the optical lens assembly of the fifth embodiment is shown in Table 16, and the aspheric coefficients of the lenses in the fifth embodiment is shown in Tables 17.

TABLE 16

Embodiment 5
f = 3.09 mm, Fno = 2.48, FOV = 88.24°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | Stop | Infinity | | −0.226 | | | | |
| 2 | First lens | 0.930 | (ASP) | 0.406 | plastic | 1.545 | 56.0 | 2.34 |
| 3 | | 2.871 | (ASP) | 0.043 | | | | |
| 4 | Second lens | 26.540 | (ASP) | 0.199 | plastic | 1.671 | 19.2 | −11.88 |
| 5 | | 6.159 | (ASP) | 0.239 | | | | |
| 6 | Third lens | −3.620 | (ASP) | 0.226 | plastic | 1.661 | 20.4 | −34.90 |
| 7 | | −4.394 | (ASP) | 0.369 | | | | |
| 8 | Fourth lens | −2.525 | (ASP) | 0.566 | plastic | 1.545 | 56.0 | 2.05 |

TABLE 16-continued

Embodiment 5
f = 3.09 mm, Fno = 2.48, FOV = 88.24°

| Surface | | Radius of curvature | | Thickness/ gap | Material | Refractive index (nd) | Abbe number (vd) | Focal length |
|---|---|---|---|---|---|---|---|---|
| 9 | | −0.838 | (ASP) | 0.273 | | | | |
| 10 | Fifth lens | −1.346 | (ASP) | 0.222 | plastic | 1.545 | 56.0 | −1.49 |
| 11 | | 2.171 | (ASP) | 0.412 | | | | |
| 12 | Optical filter | Infinity | | 0.145 | glass | 1.517 | 64.2 | |
| 13 | | Infinity | | 0.300 | | | | |
| 14 | Image plane | Infinity | | — | | | | |

The reference wavelength is 555 nm.

TABLE 17

Embodiment 5
Aspheric Coefficients

| Surface | 2 | 3 | 4 | 5 | 6 |
|---|---|---|---|---|---|
| K: | −7.9695E−01 | −8.3378E+01 | 9.7460E+01 | 3.6248E+01 | 3.5343E+01 |
| A2: | 0.0000E+00 | 0.0000E+00 | 0.0000E+00 | 0.0000E+00 | 0.0000E+00 |
| A4: | 1.2187E−02 | 3.7917E−01 | −6.3669E−02 | 3.8969E−02 | −1.4693E−01 |
| A6: | 2.0486E+00 | −5.0401E+00 | 1.8957E+00 | 5.0859E+00 | −2.2637E+00 |
| A8: | −2.0219E+01 | 4.5320E+01 | −2.3865E+01 | −6.4848E+01 | 3.0734E+01 |
| A10: | 1.4023E+02 | −3.0798E+02 | 2.1808E+02 | 5.3764E+02 | −2.1297E+02 |
| A12: | −7.0246E+02 | 1.3234E+03 | −1.2837E+03 | −2.5690E+03 | 7.4089E+02 |
| A14: | 2.4219E+03 | −3.4754E+03 | 4.9364E+03 | 6.9558E+03 | −5.9985E+02 |
| A16: | −5.3075E+03 | 5.3201E+03 | −1.1844E+04 | −9.2343E+03 | −4.1362E+03 |
| A18: | 6.4912E+03 | −4.3064E+03 | 1.5978E+04 | 2.5497E+03 | 1.3149E+04 |
| A20: | −3.3568E+03 | 1.5056E+03 | −9.0512E+03 | 4.5114E+03 | −1.2047E+04 |
| A22: | 9.9006E+00 | −1.4371E+01 | −1.8764E+00 | 2.0918E+01 | 1.2074E+02 |
| A24: | −7.3978E+00 | −1.2560E+02 | −2.7546E+02 | −1.5882E+03 | −2.1002E+02 |

| Surface | 7 | 8 | 9 | 10 | 11 |
|---|---|---|---|---|---|
| K: | −1.4616E+01 | 1.1696E+00 | −2.9231E+00 | −1.0838E+01 | −3.0142E+01 |
| A2 | 0.0000E+00 | 0.0000E+00 | 0.0000E+00 | 0.0000E+00 | 0.0000E+00 |
| A4: | −2.3433E−01 | −1.6509E−01 | −5.3588E−02 | −2.0722E−01 | −8.5559E−02 |
| A6: | 1.0231E−01 | 9.4838E−03 | −2.1168E−01 | 2.0235E−01 | −2.1310E−03 |
| A8: | −6.9221E−01 | 5.3412E−02 | 5.4240E−01 | −6.8072E−02 | 5.3303E−02 |
| A10: | 6.4626E+00 | 2.5792E−01 | −4.4921E−01 | −1.2630E−02 | −5.6831E−02 |
| A12: | −2.4329E+01 | −3.4783E−01 | 2.2406E−01 | 2.0498E−02 | 3.1176E−02 |
| A14: | 5.0330E+01 | 1.7213E−01 | −1.2190E−01 | −8.4065E−03 | −1.0096E−02 |
| A16: | −5.4614E+01 | −4.1245E−02 | 6.3947E−02 | 1.7904E−03 | 1.9258E−03 |
| A18: | 2.6058E+01 | 5.7124E−03 | −1.9046E−02 | −2.0177E−04 | −1.9887E−04 |
| A20: | −3.4852E+00 | −5.4746E−04 | 2.2057E−03 | 9.5348E−06 | 8.5488E−06 |
| A22: | 9.2813E−02 | 0.0000E+00 | 0.0000E+00 | 0.0000E+00 | 0.0000E+00 |
| A24: | 4.7960E−01 | 0.0000E+00 | 0.0000E+00 | 0.0000E+00 | 0.0000E+00 |

TABLE 18

Embodiment 5

| EPD[°] | 1.24 | TL[mm] | 3.40 | BFL[mm] | 0.86 |
|---|---|---|---|---|---|
| IMH[mm] | 3.08 | TDP7[mm] | 0.40 | HFOV[°] | 44.12 |
| CRA8[°] | 37.24 | TDP8[mm] | 0.80 | TDP10[mm] | 0.63 |

In the fifth embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Table 16-18 as the following values, and the following conditions in the following table are satisfied.

TABLE 19

Embodiment 5

| CRA8*BFL/(CT2 + CT3) [°] | 75.01 | HFOV/TL [°/mm] | 12.98 |
|---|---|---|---|
| TL/IMH | 1.10 | TDP7*R6[mm$^2$] | −1.74 |
| (R5 + R6)/(R1 + R2) | −2.11 | CRA8/R4[°/mm] | 6.05 |
| TDP8*(R5 + R6) [mm$^2$] | −6.41 | Vd1 + Vd2 | 75.23 |
| TDP8*R5[mm$^2$] | −2.90 | EPD*(R4 + R5) [mm$^2$] | 3.16 |
| f2/EPD | −9.55 | HFOV/(EPD*R10)[°/mm$^{-2}$] | 16.34 |
| R6/R7 | 1.74 | TDP10*(R9 + R10) [mm$^2$] | 0.52 |
| R4/R5 | −1.70 | | |

Sixth Embodiment

Figure 6A:
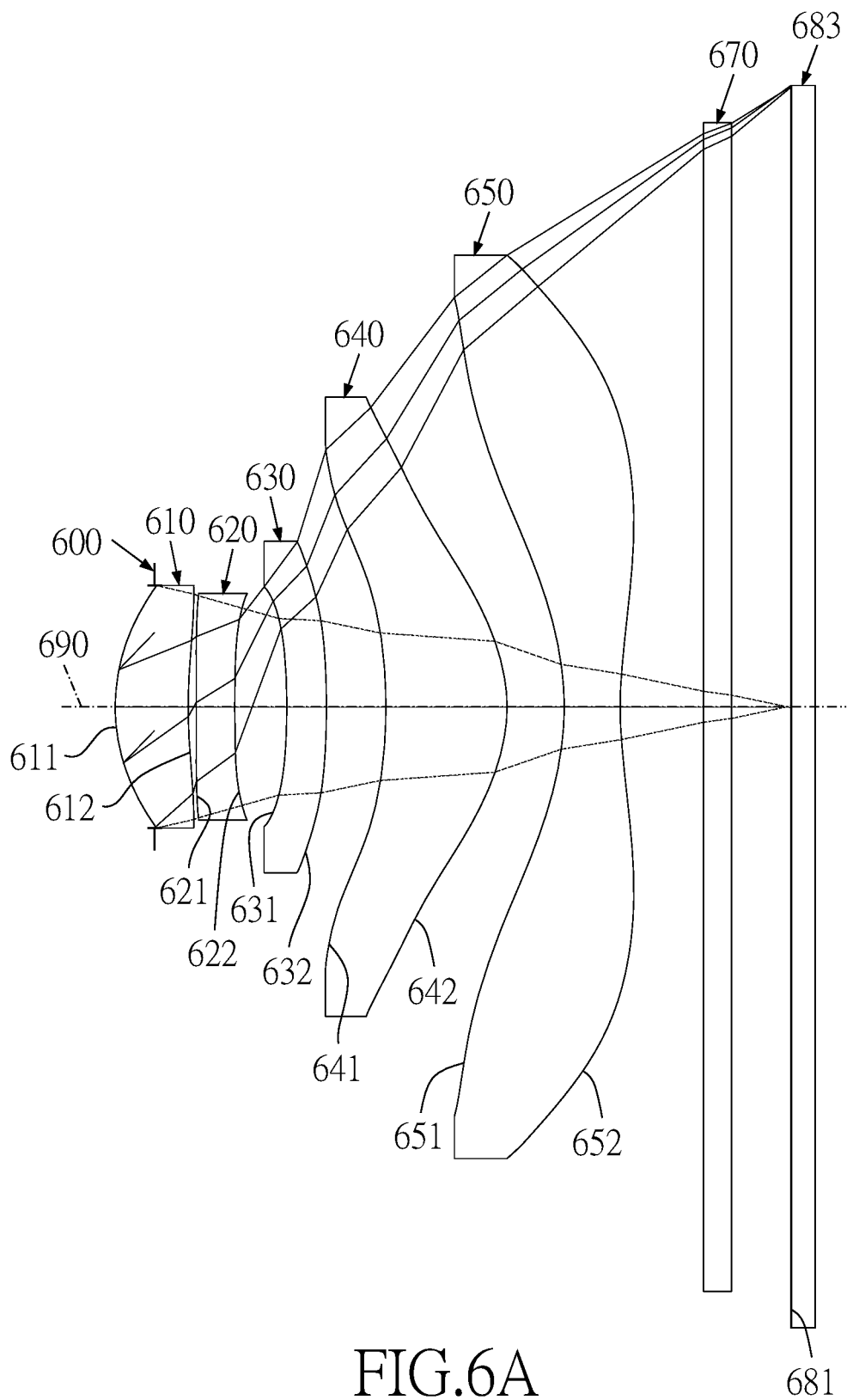
FIG. 6A is a schematic view of an optical lens assembly in accordance with a sixth embodiment of the present invention.
Figure 6B:
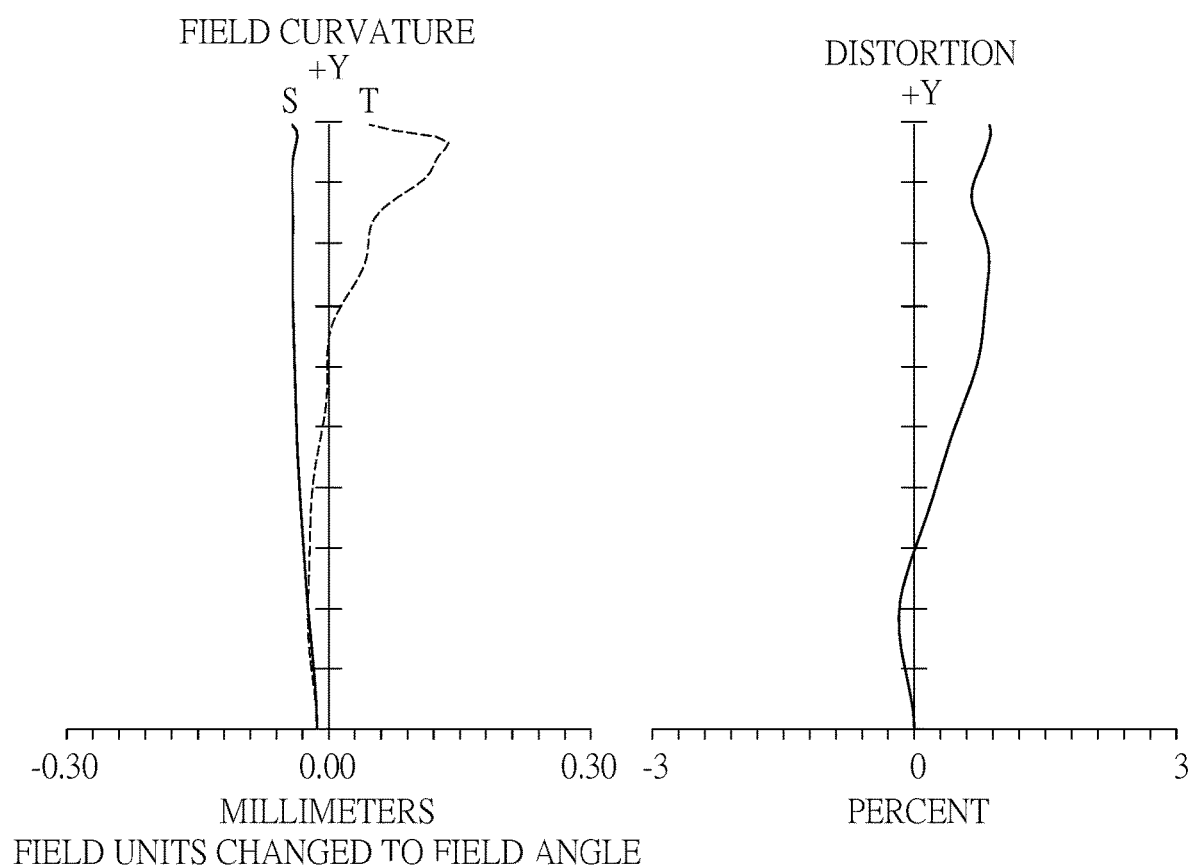
FIG. 6B is a schematic diagram showing, in order from left to right, the field curvature curve and the distortion curve of the sixth embodiment of the present invention.

Referring to FIGS. 6A and 6B, FIG. 6A shows a schematic view of an optical lens assembly in accordance with a sixth embodiment of the present invention, and FIG. 6B shows, in order from left to right, the field curvature curve and the distortion curve of the sixth embodiment of the present invention. As shown in FIG. 6A, the optical lens assembly includes, in order from an object side to an image side along an optical axis 690: a stop 600, a first lens 610, a second lens 620, a third lens 630, a fourth lens 640, a fifth lens 650, an optical filter 670, and an image plane 681. The optical lens assembly can cooperate with an image sensor 683 disposed on an image plane 681. The optical lens assembly has a total of five lenses with refractive power, but not is limited thereto.

The first lens 610 with positive refractive power includes an object-side surface 611 and an image-side surface 612, the object-side surface 611 of the first lens 610 is convex in a paraxial region thereof, the image-side surface 612 of the first lens 610 is concave in a paraxial region thereof, the object-side surface 611 and the image-side surface 612 of the first lens 610 are aspheric, and the first lens 610 is made of plastic.

The second lens 620 with negative refractive power includes an object-side surface 621 and an image-side surface 622, the object-side surface 621 of the second lens 620 is convex in a paraxial region thereof, the image-side surface 622 of the second lens 620 is concave in a paraxial region thereof, the object-side surface 621 and the image-side surface 622 of the second lens 620 are aspheric, and the second lens 620 is made of plastic.

The third lens 630 with negative refractive power includes an object-side surface 631 and an image-side surface 632, the object-side surface 631 of the third lens 630 is concave in a paraxial region thereof, the image-side surface 632 of the third lens 630 is convex in a paraxial region thereof, the object-side surface 631 and the image-side surface 632 of the third lens 630 are aspheric, and the third lens 630 is made of plastic.

The fourth lens 640 with positive refractive power includes an object-side surface 641 and an image-side surface 642, the object-side surface 641 of the fourth lens 640 is concave in a paraxial region thereof, the image-side surface 642 of the fourth lens 640 is convex in a paraxial region thereof, the object-side surface 641 and the image-side surface 642 of the fourth lens 640 are aspheric, and the fourth lens 640 is made of plastic.

The fifth lens 650 with negative refractive power includes an object-side surface 651 and an image-side surface 652, the object-side surface 651 of the fifth lens 650 is concave in a paraxial region thereof, the image-side surface 652 of the fifth lens 650 is concave in a paraxial region thereof, the object-side surface 651 and the image-side surface 652 of the fifth lens 650 are aspheric, and the fifth lens 650 is made of plastic.

The optical filter 670 is made of glass, is located between the fifth lens 650 and the image plane 681, and has no influence on the focal length of the optical lens assembly. In the present embodiment, the optical filter 670 is selected from IR-cut filters that allow light in the visible light wavelengths to pass therethrough.

The detailed optical data of the respective elements in the optical lens assembly of the sixth embodiment is shown in Table 20, and the aspheric coefficients of the lenses in the fifth embodiment is shown in Tables 21.

TABLE 20

Embodiment 6
f = 2.99 mm, Fno = 2.48, FOV = 90.89°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | Stop | Infinity | | −0.199 | | | | |
| 2 | First lens | 0.948 | (ASP) | 0.370 | plastic | 1.545 | 56.0 | 2.387 |
| 3 | | 2.997 | (ASP) | 0.039 | | | | |
| 4 | Second lens | 128.960 | (ASP) | 0.194 | plastic | 1.671 | 19.2 | −12.214 |
| 5 | | 7.772 | (ASP) | 0.264 | | | | |
| 6 | Third lens | −3.622 | (ASP) | 0.201 | plastic | 1.661 | 20.4 | −26.392 |
| 7 | | −4.662 | (ASP) | 0.299 | | | | |
| 8 | Fourth lens | −2.811 | (ASP) | 0.612 | plastic | 1.545 | 56.0 | 1.955 |
| 9 | | −0.834 | (ASP) | 0.290 | | | | |
| 10 | Fifth lens | −1.437 | (ASP) | 0.282 | plastic | 1.545 | 56.0 | −1.519 |
| 11 | | 2.100 | (ASP) | 0.421 | | | | |
| 12 | Optical filter | Infinity | | 0.145 | glass | 1.517 | 64.2 | |
| 13 | | Infinity | | 0.300 | | | | |
| 14 | Image plane | Infinity | | — | | | | |

The reference wavelength is 555 nm.

TABLE 21

Embodiment 6
Aspheric Coefficients

| Surface | 2 | 3 | 4 | 5 | 6 |
|---|---|---|---|---|---|
| K: | −8.2259E−01 | −9.2051E+01 | 1.0000E+02 | 3.5057E+01 | 3.5491E+01 |
| A2: | 0.0000E+00 | 0.0000E+00 | 0.0000E+00 | 0.0000E+00 | 0.0000E+00 |

TABLE 21-continued

Embodiment 6
Aspheric Coefficients

| | | | | | |
|---|---|---|---|---|---|
| A4: | 2.4001E−02 | 3.6441E−01 | −4.9100E−02 | 5.9920E−02 | −1.7062E−01 |
| A6: | 1.9428E+00 | −4.8711E+00 | 1.7989E+00 | 4.8735E+00 | −2.2949E+00 |
| A8: | −1.9209E+01 | 4.3347E+01 | −2.2802E+01 | −6.2046E+01 | 2.9482E+01 |
| A10: | 1.3215E+02 | −2.9008E+02 | 2.0560E+02 | 5.0616E+02 | −2.0017E+02 |
| A12: | −6.5352E+02 | 1.2302E+03 | −1.1926E+03 | −2.3884E+03 | 6.8956E+02 |
| A14: | 2.2209E+03 | −3.1889E+03 | 4.5295E+03 | 6.3846E+03 | −5.5367E+02 |
| A16: | −4.8062E+03 | 4.8171E+03 | −1.0725E+04 | −8.3590E+03 | −3.7564E+03 |
| A18: | 5.8003E+03 | −3.8483E+03 | 1.4258E+04 | 2.2353E+03 | 1.1731E+04 |
| A20: | −2.9558E+03 | 1.3070E+03 | −8.0002E+03 | 3.6174E+03 | −1.0564E+04 |
| A22: | 0.0000E+00 | 0.0000E+00 | 0.0000E+00 | 0.0000E+00 | 1.4799E+02 |

| Surface | 7 | 8 | 9 | 10 | 11 |
|---|---|---|---|---|---|
| K: | 7.5355E+00 | 1.0554E+00 | −2.6826E+00 | −1.0792E+01 | −2.7644E+01 |
| A2: | 0.0000E+00 | 0.0000E+00 | 0.0000E+00 | 0.0000E+00 | 0.0000E+00 |
| A4: | −2.4083E−01 | −1.4321E−01 | −4.3810E−02 | −2.0516E−01 | −7.9710E−02 |
| A6: | 4.3558E−02 | 2.4860E−03 | −2.0478E−01 | 1.9696E−01 | −2.7200E−03 |
| A8: | −6.4155E−01 | 4.6990E−02 | 5.1713E−01 | −6.4890E−02 | 5.1052E−02 |
| A10: | 6.1821E+00 | 2.4199E−01 | −4.2330E−01 | −1.1910E−01 | −5.3520E−02 |
| A12: | −2.2568E+01 | −3.2272E−01 | 2.0829E−01 | 1.9052E−02 | 2.8983E−02 |
| A14: | 4.6094E+01 | 1.5835E−01 | −1.1181E−01 | −7.7100E−03 | −9.2600E−03 |
| A16: | −4.9587E+01 | −3.7090E−02 | 5.7916E−02 | 1.6210E−03 | 1.7430E−03 |
| A18: | 2.3212E+01 | 5.1260E−03 | −1.7010E−02 | −1.8000E−04 | −1.8000E−04 |
| A20: | −2.7430E+00 | −5.6000E−04 | 1.9500E−03 | 8.4100E−06 | 7.5400E−06 |
| A22: | 0.0000E+00 | 0.0000E+00 | 0.0000E+00 | 0.0000E+00 | 0.0000E+00 |

TABLE 22

Embodiment 6

| | | | | | |
|---|---|---|---|---|---|
| EPD[°] | 1.21 | TL[mm] | 3.42 | BFL[mm] | 0.87 |
| IMH[mm] | 3.08 | TDP7[mm] | 0.30 | HFOV[°] | 45.44 |
| CRA8[°] | 37.02 | TDP8[mm] | 0.71 | TDP10[mm] | 0.57 |

In the sixth embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Table 20-22 as the following values, and the following conditions in the following table are satisfied.

TABLE 23

Embodiment 6

| | |
|---|---|
| CRA8*BFL/(CT2 + CT3) [°] | 81.21 |
| TL/IMH | 1.11 |
| (R5 + R6)/(R1 + R2) | −2.10 |
| TDP8*(R5 + R6) [mm²] | −5.89 |
| TDP8*R5 [mm²] | −2.58 |
| f2/EPD | −10.13 |
| R6/R7 | 1.66 |
| R4/R5 | −2.15 |
| HFOV/TL [°/mm] | 13.29 |
| TDP7*R6[mm²] | −1.42 |
| CRA8/R4[°/mm] | 4.76 |
| Vd1 + Vd2 | 75.23 |
| EPD*(R4 + R5) [mm²] | 5.00 |
| HFOV/(EPD*R10)[°/mm⁻²] | 17.96 |
| TDP10*(R9 + R10) [mm²] | 0.38 |

Seventh Embodiment

Figure 7:
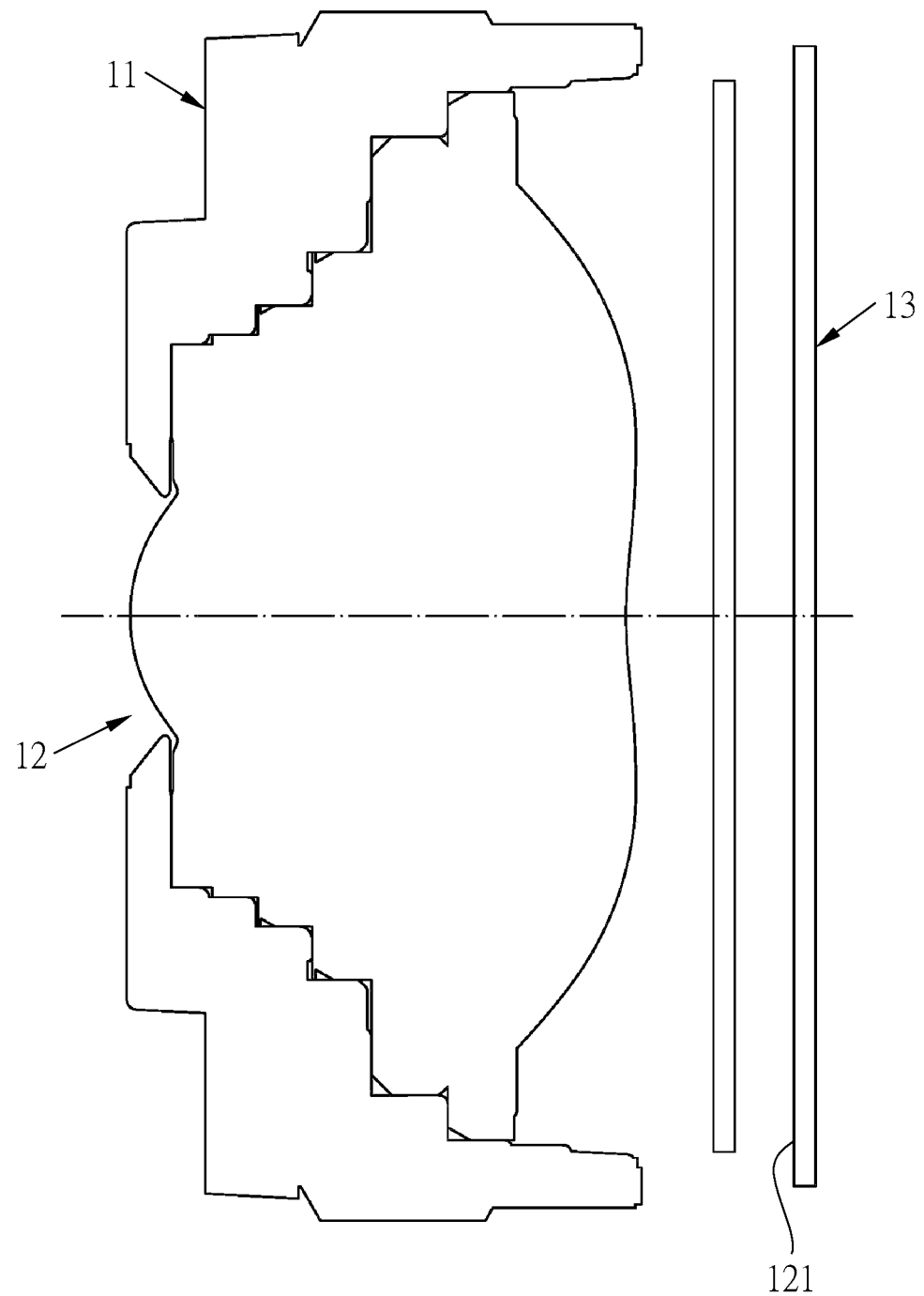
FIG. 7 is a schematic view of a photographing module in accordance with a seventh embodiment of the present invention.

Referring to FIG. 7, which shows a schematic view of a photographing module in accordance with a seventh embodiment of the present invention. The photographing module 10 includes a lens barrel 11, an optical lens assembly 12 and an image sensor 13. The optical lens assembly 12 is the optical lens assembly of any one of the above embodiments and is disposed in the lens barrel 11. The image sensor 13 is disposed on an image plane 121 of the optical lens assembly 12 and is an electronic image sensor (such as, CMOS or CCD) with good photosensitivity and low noise to really present the imaging quality of the optical lens assembly.

For the optical lens assembly in the present invention, the lenses can be made of plastic or glass. If the lens is made of plastic, it is conducive to reducing the manufacturing cost. If the lens is made of glass, it is conducive to enhancing the degree of freedom in the arrangement of refractive power of the optical lens assembly. Moreover, any of the object-side and image-side surfaces of a respective lens of the optical lens assembly can be aspheric, and the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

In the optical lens assembly of the present invention, the optical filter is made of, but not limited to, glass and can be made of other materials with high Abbe numbers.

For the optical lens assembly in the present invention, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

The optical lens assembly of the present invention can be used in focus-adjustable optical systems according to the actual requirements and have good aberration correction ability and better image quality. The optical lens assembly of the present invention can also be used in electronic imaging systems, such as, 3D image capturing device, wearable display of virtual reality (VR) or augmented reality (AR), game player, surveillance camera, digital camera, mobile device, tablet computer, household electronic device or vehicle camera.

What is claimed is:

1. An optical lens assembly comprising, in order from an object side to an image side:
    a first lens with positive refractive power;
    a second lens with negative refractive power;
    a third lens with negative refractive power;
    a fourth lens with positive refractive power; and
    a fifth lens with negative refractive power;
    wherein a distance from an image-side surface of the fifth lens to an image plane along an optical axis is BFL, a thickness of the second lens along the optical axis is CT2, a thickness of the third lens along the optical axis is CT3, an incident angle of a chief ray on 80% of the maximum image height of the optical lens assembly is CRA8, and the following condition is satisfied: $51.97°<CRA8*BFL/(CT2+CT3)<97.45°$.

2. The optical lens assembly as claimed in claim 1, wherein a distance from an object-side surface of the first lens to the image plane along the optical axis is TL, a maximum image height of the optical lens assembly is IMH, and the following condition is satisfied: $0.88<TL/IMH<1.39$.

3. The optical lens assembly as claimed in claim 1, wherein a radius of curvature of an object-side surface of the first lens is R1, a radius of curvature of an image-side surface of the first lens is R2, a radius of curvature of an object-side surface of the third lens is R5, a radius of curvature of an image-side surface of the third lens is R6, and the following condition is satisfied: $-4.10<(R5+R6)/(R1+R2)<-1.68$.

4. The optical lens assembly as claimed in claim 1, wherein an absolute value of a displacement in parallel to the optical axis from an intersection between an image-side surface of the fourth lens and the optical axis to a maximum effective radius position on the image-side surface of the fourth lens is TDP8, a radius of curvature of an object-side surface of the third lens is R5, a radius of curvature of an image-side surface of the third lens is R6, and the following condition is satisfied: $-9.21\ mm^2<TDP8*(R5+R6)<-4.35\ mm^2$.

5. The optical lens assembly as claimed in claim 1, wherein an absolute value of a displacement in parallel to the optical axis from an intersection between an image-side surface of the fourth lens and the optical axis to a maximum effective radius position on the image-side surface of the fourth lens is TDP8, a radius of curvature of an object-side surface of the third lens is R5, and the following condition is satisfied: $-3.48\ mm^2<TDP8*R5<-1.85\ mm^2$.

6. The optical lens assembly as claimed in claim 1, wherein a focal length of the second lens is f2, an entrance pupil diameter of the optical lens assembly is EPD, and the following condition is satisfied: $-14.94<f2/EPD<-5.88$.

7. The optical lens assembly as claimed in claim 1, wherein a radius of curvature of an image-side surface of the third lens is R6, a radius of curvature of an object-side surface of the fourth lens is R7, and the following condition is satisfied: $1.33<R6/R7<4.37$.

8. The optical lens assembly as claimed in claim 1, wherein a radius of curvature of an image-side surface of the second lens is R4, a radius of curvature of an object-side surface of the third lens is R5, and the following condition is satisfied: $-5.85<R4/R5<-1.28$.

9. The optical lens assembly as claimed in claim 1, wherein half of a maximum field of view of the optical lens assembly is HFOV, a distance from an object-side surface of the first lens to the image plane along the optical axis is TL, and the following condition is satisfied: $10.17°/mm<HFOV/TL<15.95°/mm$.

10. The optical lens assembly as claimed in claim 1, wherein an absolute value of a displacement in parallel to the optical axis from an intersection between an object-side surface of the fourth lens and the optical axis to a maximum effective radius position on the object-side surface of the fourth lens is TDP7, a radius of curvature of an image-side surface of the third lens is R6, and the following condition is satisfied: $-3.17\ mm^2<TDP7*R6<-1.14\ mm^2$.

11. The optical lens assembly as claimed in claim 1, wherein the incident angle of the chief ray on 80% of the maximum image height of the optical lens assembly is CRA8, a radius of curvature of an image-side surface of the second lens is R4, and the following condition is satisfied: $1.63°/mm<CRA8/R4<7.69°/mm$.

12. The optical lens assembly as claimed in claim 1, wherein an entrance pupil diameter of the optical lens assembly is EPD, a radius of curvature of an image-side surface of the second lens is R4, a radius of curvature of an object-side surface of the third lens is R5, and the following condition is satisfied: $2.03\ mm^2<EPD*(R4+R5)<19.81\ mm^2$.

13. The optical lens assembly as claimed in claim 1, wherein half of a maximum field of view of the optical lens assembly is HFOV, an entrance pupil diameter of the optical lens assembly is EPD, a radius of curvature of the image-side surface of the fifth lens is R10, and the following condition is satisfied: $8.35°/mm^{-2}<HFOV/(EPD*R10)<21.98°/mm^{-2}$.

14. The optical lens assembly as claimed in claim 1, wherein an absolute value of a displacement in parallel to the optical axis from an intersection between the image-side surface of the fifth lens and the optical axis to a maximum effective radius position on the image-side surface of the fifth lens is TDP10, a radius of curvature of an object-side surface of the fifth lens is R9, a radius of curvature of the image-side surface of the fifth lens is R10, and the following condition is satisfied: $0.2\ mm^2<TDP10*(R9+R10)<0.97\ mm^2$.

15. A photographing module, comprising:
    a lens barrel;
    an optical lens assembly disposed in the lens barrel; and
    an image sensor disposed on an image plane of the optical lens assembly;
    wherein the optical lens assembly comprising, in order from an object side to an image side:
    a first lens with positive refractive power;
    a second lens with negative refractive power;
    a third lens with negative refractive power;
    a fourth lens with positive refractive power; and
    a fifth lens with negative refractive power;
    wherein a distance from an image-side surface of the fifth lens to an image plane along an optical axis is BFL, a thickness of the second lens along the optical axis is CT2, a thickness of the third lens along the optical axis is CT3, an incident angle of a chief ray on 80% of the maximum image height of the optical lens assembly is CRA8, and the following condition is satisfied: $51.97°<CRA8*BFL/(CT2+CT3)<97.45°$.

16. The photographing module as claimed in claim 15, wherein a radius of curvature of an object-side surface of the first lens is R1, a radius of curvature of an image-side surface of the first lens is R2, a radius of curvature of an object-side surface of the third lens is R5, a radius of curvature of an image-side surface of the third lens is R6, and the following condition is satisfied: $-4.10<(R5+R6)/(R1+R2)<-1.68$.

17. The photographing module as claimed in claim 15, wherein an absolute value of a displacement in parallel to the optical axis from an intersection between an image-side surface of the fourth lens and the optical axis to a maximum effective radius position on the image-side surface of the fourth lens is TDP8, a radius of curvature of an object-side surface of the third lens is R5, a radius of curvature of an image-side surface of the third lens is R6, and the following condition is satisfied: $-9.21\ mm^2<TDP8*(R5+R6)<-4.35\ mm^2$.

18. The photographing module as claimed in claim 15, wherein an absolute value of a displacement in parallel to the optical axis from an intersection between an object-side surface of the fourth lens and the optical axis to a maximum effective radius position on the object-side surface of the fourth lens is TDP7, a radius of curvature of an image-side surface of the third lens is R6, and the following condition is satisfied: $-3.17\ mm^2<TDP7*R6<-1.14\ mm^2$.

19. The photographing module as claimed in claim 15, wherein the incident angle of the chief ray on 80% of the maximum image height of the optical lens assembly is CRA8, a radius of curvature of an image-side surface of the second lens is R4, and the following condition is satisfied: $1.63°/mm<CRA8/R4<7.69°/mm$.

20. The photographing module as claimed in claim 15, wherein an absolute value of a displacement in parallel to the optical axis from an intersection between the image-side surface of the fifth lens and the optical axis to a maximum effective radius position on the image-side surface of the fifth lens is TDP10, a radius of curvature of an object-side surface of the fifth lens is R9, a radius of curvature of the image-side surface of the fifth lens is R10, and the following condition is satisfied: $0.2\ mm^2<TDP10*(R9+R10)<0.97\ mm^2$.

* * * * *